(12) United States Patent
Ohara

(10) Patent No.: US 8,480,122 B2
(45) Date of Patent: Jul. 9, 2013

(54) AIRBAG DEVICE

(75) Inventor: Koji Ohara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/257,832

(22) PCT Filed: Jul. 24, 2009

(86) PCT No.: PCT/JP2009/063271
§ 371 (c)(1),
(2), (4) Date: Sep. 20, 2011

(87) PCT Pub. No.: WO2011/010387
PCT Pub. Date: Jan. 27, 2011

(65) Prior Publication Data
US 2012/0112441 A1 May 10, 2012

(51) Int. Cl.
*B60R 21/20* (2006.01)

(52) U.S. Cl.
USPC .......................................................... 280/729

(58) Field of Classification Search
USPC .............. 280/729, 730.1, 732, 736, 740, 742, 280/743.1, 743.2
See application file for complete search history.

(56) References Cited

U.S. PATENT DOCUMENTS

| | | | | |
|---|---|---|---|---|
| 3,767,225 A | * | 10/1973 | Mazelsky | 280/729 |
| 3,848,150 A | * | 11/1974 | Taxil et al. | 313/484 |
| 3,951,427 A | * | 4/1976 | Wilfert | 280/732 |
| 4,006,918 A | * | 2/1977 | MacFarland | 280/729 |
| 4,043,572 A | | 8/1977 | Hattori et al. | |
| 4,076,277 A | * | 2/1978 | Kuwakado et al. | 280/738 |
| 4,136,894 A | * | 1/1979 | Ono et al. | 280/729 |
| 4,360,223 A | * | 11/1982 | Kirchoff | 280/729 |

(Continued)

FOREIGN PATENT DOCUMENTS

| | | |
|---|---|---|
| DE | 198 56 407 A1 | 6/1999 |
| EP | 0 611 685 A1 | 8/1994 |

(Continued)

OTHER PUBLICATIONS

International Search Report mailed Aug. 25, 2009 issued in International Patent Application No. PCT/JP2009/063271 (with translation).

(Continued)

*Primary Examiner* — Joseph Rocca
*Assistant Examiner* — Robert A Coker
(74) *Attorney, Agent, or Firm* — Oliff & Berridge, PLC

(57) ABSTRACT

An airbag device equipped with an airbag having a reduced volume. An airbag inflated and expanded, by supplied gas, from a state folded in the rear of an instrument panel with respect to the vehicle's front-rear direction has an outer bag for restraining the upper body of a vehicle occupant from the front side in the vehicle's front-rear direction and also has a reaction force support tube inflated and expanded, by supplied gas, at the front on the inner side of the outer airbag. An inflator supplies gas to each of the outer bag and the reaction force support tube. When the outer bag restrains the upper body of the vehicle occupant, gas discharge from the reaction force support tube is suppressed by a one-way valve and the pressure in the reaction force support tube is maintained at a pressure higher than the pressure in the outer bag.

9 Claims, 12 Drawing Sheets

U.S. PATENT DOCUMENTS

| | | | |
|---|---|---|---|
| 5,513,877 A * | 5/1996 | MacBrien et al. | 280/732 |
| 5,577,765 A * | 11/1996 | Takeda et al. | 280/729 |
| 6,431,586 B1 * | 8/2002 | Eyrainer et al. | 280/730.1 |
| 6,802,529 B2 * | 10/2004 | Takedomi et al. | 280/729 |
| 7,731,229 B2 * | 6/2010 | Song et al. | 280/732 |
| 7,758,069 B2 * | 7/2010 | Enders | 280/732 |
| 2001/0007391 A1 | 7/2001 | Hamada et al. | |
| 2002/0093184 A1 | 7/2002 | Hirano et al. | |
| 2003/0015861 A1 * | 1/2003 | Abe | 280/730.1 |
| 2003/0034638 A1 * | 2/2003 | Yoshida | 280/729 |
| 2003/0034639 A1 * | 2/2003 | Amamori | 280/729 |
| 2006/0001244 A1 | 1/2006 | Taguchi et al. | |
| 2008/0048420 A1 | 2/2008 | Washino | |

FOREIGN PATENT DOCUMENTS

| | | |
|---|---|---|
| JP | A-51-23917 | 2/1976 |
| JP | U-51-59028 | 5/1976 |
| JP | U-7-17662 | 3/1995 |
| JP | A-11-170955 | 6/1999 |
| JP | A-11-227553 | 8/1999 |
| JP | A-11-301403 | 11/1999 |
| JP | A-2000-153746 | 6/2000 |
| JP | A-2001-63508 | 3/2001 |
| JP | A-2006-8015 | 1/2006 |
| JP | A-2007-45190 | 2/2007 |
| JP | A-2007-62455 | 3/2007 |
| JP | A-2007-106376 | 4/2007 |
| JP | A-2007-161201 | 6/2007 |
| JP | A-2008-49858 | 3/2008 |

OTHER PUBLICATIONS

Apr. 4, 2013 European Search Report issued in European Patent Application No. 09 847 572.6.

* cited by examiner

AIRBAG DEVICE

TECHNICAL FIELD

The present invention relates to an airbag device that is inflated and expanded at a vehicle front side of a passenger, and is for restraining forward movement of the passenger.

BACKGROUND ART

In a so-called top-mount-type airbag device for a passenger's seat that is provided at an opening portion of a substantially flat top surface of an instrument panel, there is known a technique of providing an inner bag for controlling the flow of gas to the airbag interior (see, for example, Japanese Patent Application Laid-Open No. 11-170955). In this airbag device, while a gas supply is received through an inner bag that is expanded first, the airbag is expanded so as to squeeze-out between the inner bag and a windshield glass or the instrument panel, and the speed of expansion of the airbag is reduced.

Further, in addition thereto, there are known structures, in an airbag device for a passenger's seat, in which various contrivances have been made with respect to the expanded form of the airbag before restraining the passenger (see, for example, Japanese Patent Application Laid-Open No. 51-23917, Japanese Patent Application Laid-Open No. 2007-106376, Japanese Patent Application Laid-Open No. 2007-161201, Japanese Utility Model Application Laid-Open No. 7-17662, Japanese Patent Application Laid-Open No. 2007-045190, Japanese Patent Application Laid-Open No. 2007-062455).

DISCLOSURE OF THE INVENTION

Technical Problem

By the way, when an airbag restrains a passenger, movement toward the front of the vehicle is suppressed mainly by frictional force between the airbag and the windshield glass, the instrument panel. Therefore, in addition to the volume required for restraining a passenger, the airbag needs volume in order to ensure the frictional force.

An object of the present invention is to provide an airbag device in which the volume of an airbag can be reduced.

Solution to Problem

An airbag device relating to a first aspect of the present invention includes: a first bag that, by receiving a gas supply and being inflated and expanded from a folded-up state within a rear portion in a vehicle longitudinal direction at an instrument panel, restrains an upper body of a vehicle passenger from a front side in the vehicle longitudinal direction; a second bag that has a smaller volume than the first bag and that, from a state of being folded-up together with the airbag, receives a gas supply, and is inflated and expanded at an interior of the first bag or at a front side in the vehicle longitudinal direction with respect to the first bag such that, when the first bag restrains the vehicle passenger, an upper end side portion in a vehicle vertical direction contacts a windshield glass and a lower end side portion contacts a surface of the instrument panel; an inflator that generates gas that is supplied to the first bag and the second bag; and an internal pressure difference imparting structure for making an internal pressure of the second bag become higher than an internal pressure of the first bag, at least when the first bag restrains the vehicle passenger.

In accordance with the above-described aspect, the first, second bags are accommodated in a folded-up state within a rear portion in the vehicle longitudinal direction at the instrument panel. When the inflator is operated at the time of a front collision of the vehicle for example, the first, second bags are inflated and expanded by gas from the inflator. At least when the first bag restrains the upper body of the passenger, the internal pressure of the second bag becomes higher than the internal pressure of the first bag due to the internal pressure difference imparting structure. The second bag is expanded within the first bag, or at the front side in the vehicle longitudinal direction with respect to the first bag.

Therefore, the second bag, whose internal pressure is relatively high at the time of the restraining of the passenger by the first bag, is pushed toward the front of the vehicle, and the upper end side thereof is made to contact the windshield glass, and the lower end side thereof is made to contact the instrument panel. Due thereto, at the present airbag device, a portion of the reaction force at the time when the first bag restrains the passenger is supported by the contact (interference) of the second bag with the windshield glass, the instrument panel. Due thereto, the shared burden of the aforementioned supporting of the reaction force that is borne by the frictional force between the first bag and the windshield glass, the instrument panel is lessened, and the contact surface areas between the first bag and the windshield glass, the instrument panel can be reduced.

In this way, in the airbag device of the above-described aspect, the volume of the airbag can be reduced.

The above-described aspect may be structured so as to further comprise: a gas flow path member that is flexible, and that is folded-up together with the first bag and the second bag, and that, by a gas supply from the inflator, is inflated and expanded and directly supplies gas from the inflator to the first bag and the second bag respectively, wherein the internal pressure difference imparting structure is structured to include a gas discharge suppressing structure that suppresses discharging, from the second bag, of gas supplied to the second bag.

In accordance with the above-described aspect, when the inflator is operated, the gas flow path member is inflated and expanded by gas from the inflator. Then, gas from the inflator is supplied to the first bag, the second bag respectively via this gas flow path member. The first bag, the second bag are respectively inflated and expanded by the gas supply. Then, at least at the time of restraining the passenger by the first bag, discharging of gas from the second bag is suppressed by the gas discharge suppressing structure, and therefore, the internal pressure of the second bag is maintained. Due thereto, as described above, the second bag can be made to share the burden in supporting a portion of the reaction force that accompanies the restraining of the passenger.

The above-described aspect may be structured such that the gas discharge suppressing structure includes a one-way valve that is provided at the gas flow path member or a communicating portion of the gas flow path member and the second bag, and that permits gas flow from the gas flow path member to the second bag and prevents or suppresses gas flow from the second bag to the gas flow path member.

In accordance with the above-described aspect, due to the second bag receiving pushing force accompanying the restraining of the passenger by the first bag for example, the internal pressure of the second bag becomes higher than the internal pressure of the gas flow path member. Thus, the gas within the second bag attempts to flow toward the gas flow path member side, but, due to the one-way valve (check valve) closing, this flow of gas is suppressed or prevented. Due thereto, by a simple structure, the second bag can be made to share the burden in supporting a portion of the reaction force that accompanies the restraining of the passenger, as described above.

The above-described aspect may be structured such that a pair of the second bags is provided within the first bag so as to be expanded such that an interval in a vehicle transverse direction gradually widens from a lower end toward an upper end in the vehicle vertical direction.

In accordance with the above-described aspect, because the pair of the second bags form a substantial "V" shape in front view, the reaction force that accompanies the restraining of the upper body of the passenger by the first bag is supported in a form that is near three-point support. Therefore, the state of restraining of the upper body of the passenger by the first bag (the posture of expansion) is stable.

The above-described aspect may be structured such that the second bag is structured so as to be expanded, within the first bag, in a shape in which an interval between both edges in a vehicle transverse direction gradually widens from a lower end toward an upper end in the vehicle vertical direction.

In accordance with the above-described aspect, because the both edges in the vehicle transverse direction of the second bag form a substantial "V" shape in front view, the reaction force that accompanies the restraining of the upper body of the passenger by the first bag is supported in a form that is near three-point support. Therefore, the state of restraining of the upper body of the passenger by the first bag (the posture of expansion) is stable.

The above-described aspect may be structured so as to further comprise: a third bag that has a smaller volume than the first bag and that, by receiving a gas supply through the gas flow path member and being inflated and expanded from a folded-up state, is inflated and expanded so as to contact the instrument panel at a lower side in the vehicle vertical direction with respect to the first bag at least when the first bag restrains the passenger; and a gas discharge suppressing structure that suppresses discharging, from the third bag, of gas supplied to the third bag.

In accordance with the above-described aspect, when the inflator is operated, the gas flow path member is inflated and expanded by gas from the inflator. Then, gas from the inflator is directly supplied to the first through third bags respectively through the gas flow path member. Due thereto, the third bag is inflated and expanded at the vehicle lower side of the first bag. Further, in the present airbag device, the third bag can be made to exhibit a reaction force supporting function at the time of the restraining of the passenger by the first bag. Therefore, the present airbag device contributes to an even further reduction in the volume of the airbag on the whole.

The above-described aspect may be structured such that the third bag is structured so as to, by being inflated and expanded, restrain knees of the passenger from a rear side in the vehicle longitudinal direction.

In accordance with the above-described aspect, when the inflator is operated, the gas flow path member is inflated and expanded by gas from the inflator. Then, gas from the inflator is directly supplied to the first through third bags respectively via this gas flow path member. Due thereto, the third bag can be expanded in a short time, and the knees of the passenger can be protected by this third bag. In other words, the third bag that has a knee protecting function is utilized, and the supported reaction force of the state of the passenger by the first bag can be supported with the burden thereof being shared.

The above-described aspect may be structured so as to further comprise: an airbag case that houses the inflator, and the first bag and the second bag that are in a folded-up state; and a gas distributing structure that is provided at the airbag case, and distributes gas of the inflator to the first bag and the second bag.

In accordance with the above-described aspect, due to the gas distributing structure that is provided at the airbag case, the gas of the inflator is distributed to the first, second bags. The first, second bags are not directly communicated. Therefore, discharging of gas from the second bag accompanying the restraining of the passenger by the first bag is suppressed, it is easy for the internal pressure of the second bag to be maintained, and a difference in internal pressure arises between the first bag and the second bag.

The above-described aspect may be structured such that, due to a partitioning cloth, that demarcates a bag body in the vehicle longitudinal direction, being sewn to an interior of the bag body, a portion, at the bag body, that is expanded at a rear side in the vehicle longitudinal direction of the partitioning cloth is made to be the first bag, and a portion, at the bag body, that is expanded at a front side in the vehicle longitudinal direction of the partitioning cloth is made to be the second bag.

In accordance with the above-described aspect, the first, second airbags are formed by demarcating the common bag body by a partitioning cloth. Therefore, at the vehicle front side of the first bag, the second bag is positioned over substantially the entire width, in the vehicle transverse direction, of the first bag. Due thereto, in the present airbag device, a portion of the reaction force at the time of restraining the passenger by the first bag is supported well at the second bag.

Advantageous Effects of Invention

As described above, the airbag device relating to the present invention has the excellent effect that the volume of the airbag can be reduced.

BEST MODE FOR CARRYING OUT THE INVENTION

Figure 1:
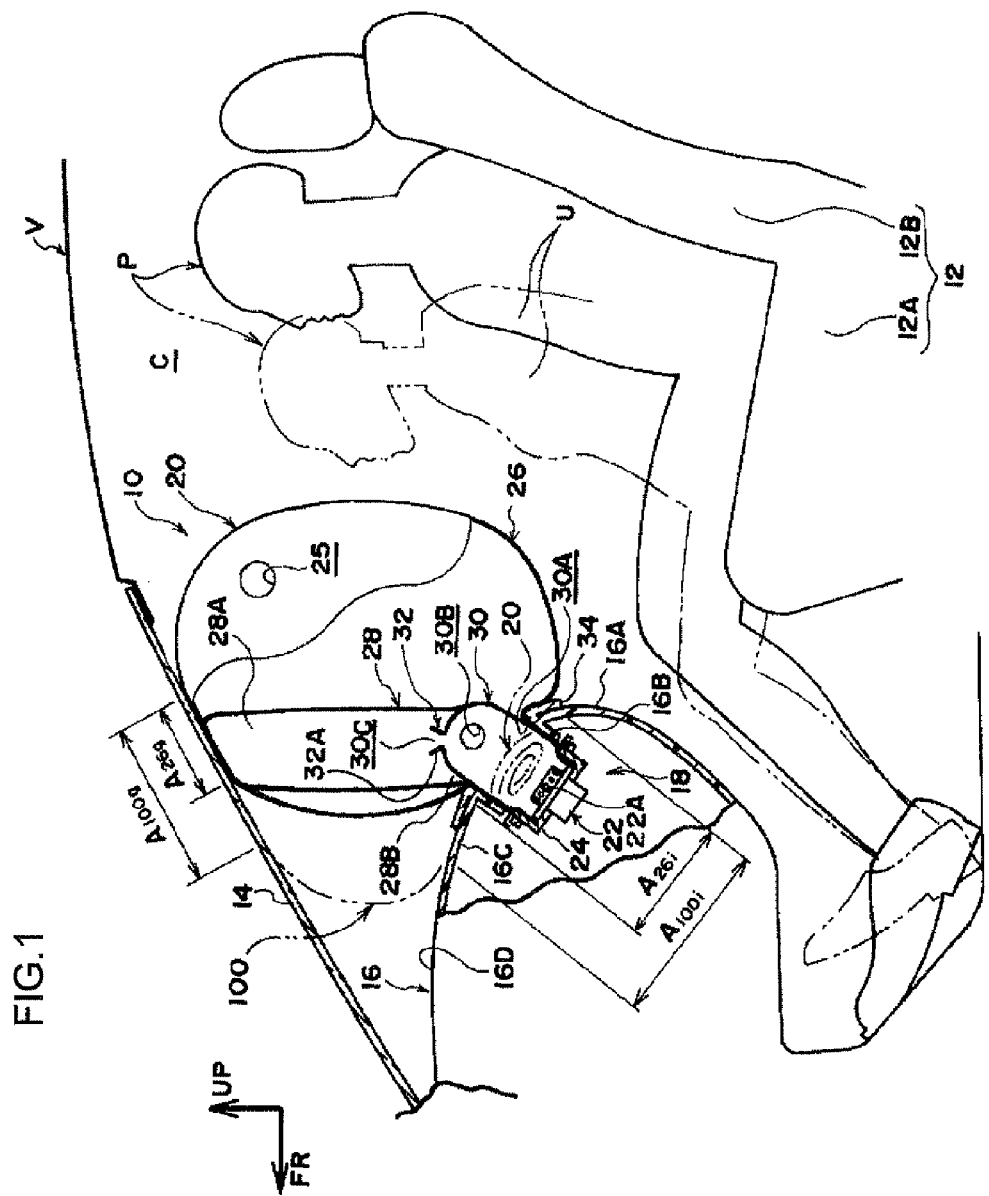
FIG. 1 is a side sectional view schematically showing an airbag expanded state at an airbag device for a passenger's seat relating to a first embodiment of the present invention.
Figure 2:
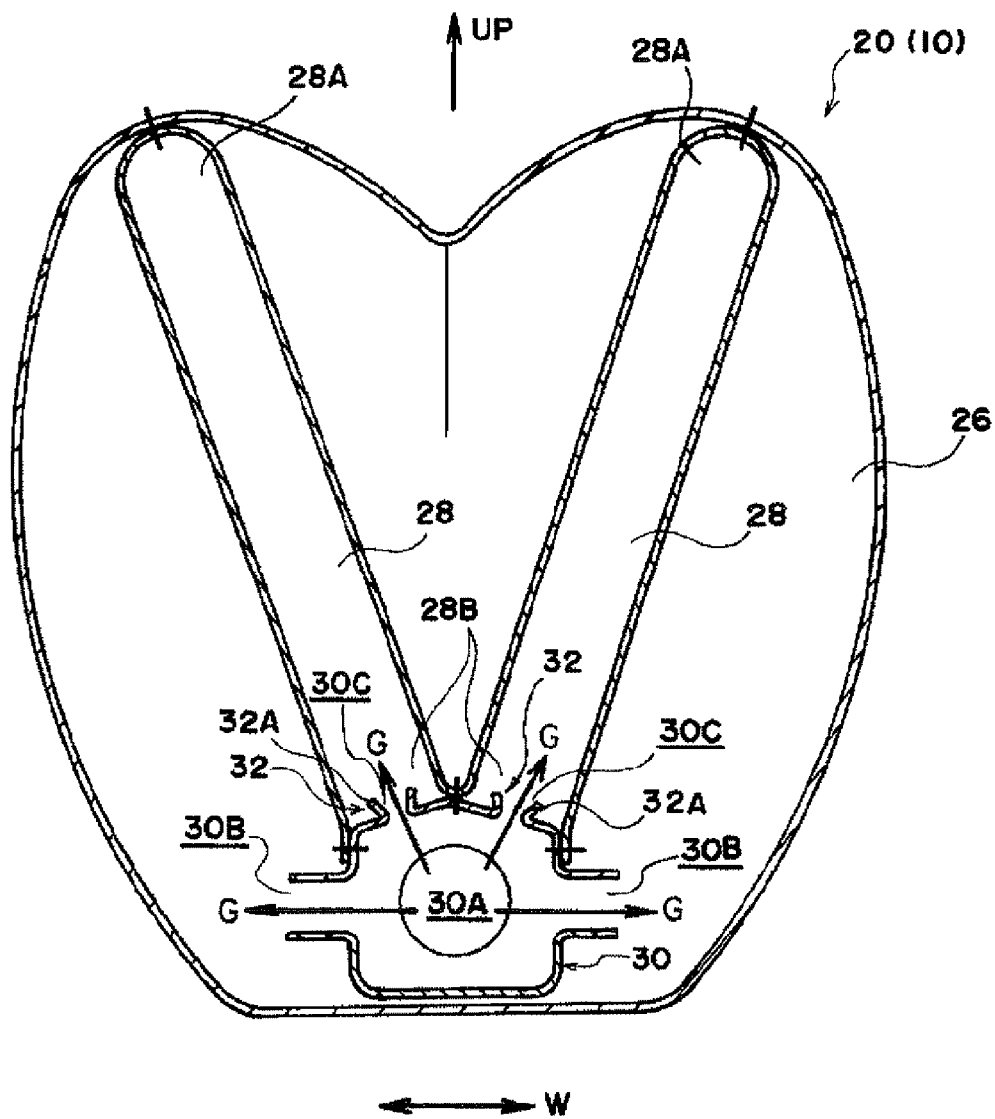
FIG. 2 is a front sectional view of an airbag that structures the airbag device for a passenger's seat relating to the first embodiment of the present invention.
Figure 3:
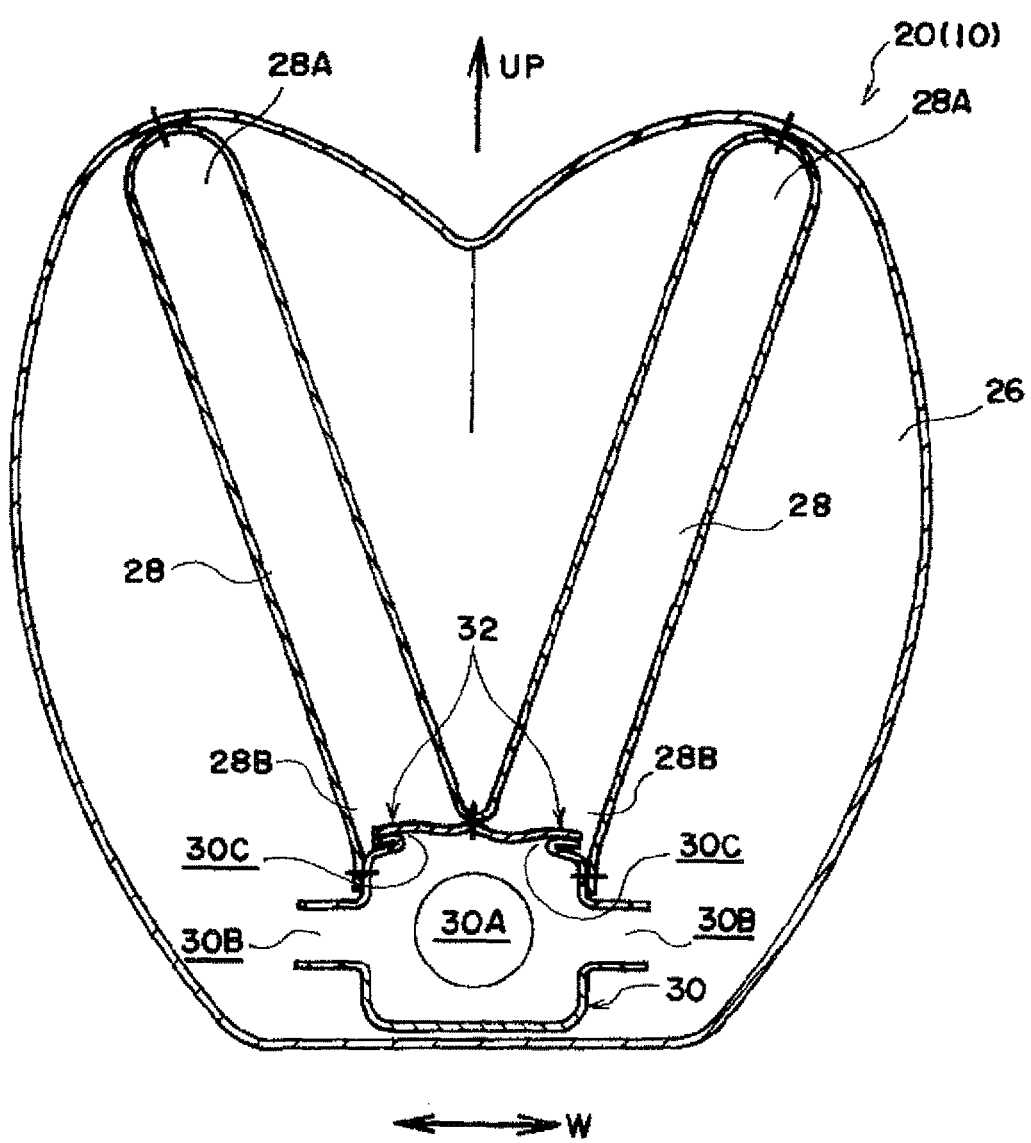
FIG. 3 is a front sectional view of reaction force supporting tubes in an internal pressure maintained state at the airbag that structures the airbag device for a passenger's seat relating to the first embodiment of the present invention.

An airbag device 10 for a passenger's seat, that serves as an airbag device relating to a first embodiment of the present invention, is described on the basis of FIG. 1 to FIG. 3. Note that arrow FR, arrow UP, arrow W that are written appropriately in the respective drawings respectively indicate the vehicle front direction (traveling direction), the upward direction, and the vehicle transverse direction of an automobile V, a passenger's seat 12 to which the airbag device 10 for a passenger's seat is applied. Further, when describing the shape and the like of an airbag 20 (structural portions thereof) in the following description, the shape and the like in the inflated and expanded state are meant unless particularly noted.

The front portion of a vehicle cabin C interior of the automobile V in an operated state of the airbag device 10 for a passenger's seat is shown in a schematic side sectional view in FIG. 1. As shown in this drawing, the passenger's seat 12 that serves as a seat for a vehicle is disposed at vehicle cabin C interior front portion. The passenger's seat 12 has a seat cushion 12A on which a passenger P sits while facing toward the front of the vehicle, and a seat back 12B that supports, from the vehicle rear side, the passenger P seated on the seat cushion 12A. The passenger's seat 12 is structured such that the posture (position) thereof can be adjusted to postures including a posture at which the passenger P of a large build is seated as shown by the solid lines in FIG. 1, and a posture at which a passenger of a small build is seated as shown by the two-dot chain lines.

A windshield glass 14 that prescribes the vehicle front end of the vehicle cabin C is disposed at the vehicle front side with respect to the passenger's seat 12. Further, an instrument panel 16 is provided at the vehicle lower side with respect to the windshield glass 14. An upper portion 16A in the vehicle vertical direction of the instrument panel 16 projects toward the passenger's seat 12 side, and the passenger P seated in the passenger's seat 12 places his/her legs beneath the upper portion 16A.

The airbag device 10 for a passenger's seat has an airbag module 18 that is disposed within the instrument panel 16. The airbag module 18 is structured with an airbag 20 for restraining an upper body U of the passenger P, an inflator 22 for supplying gas to the airbag 20, and an airbag case 24 that holds (accommodates portions of) the airbag 20 and the inflator 22, being the main portions thereof. The airbag module 18 is, at the airbag case 24, held by a mounting portion 16B that is provided at the instrument panel 16.

In this embodiment, the airbag module 18 is disposed at a curved portion 16C of the rear portion (a vicinity of the rear end) of the instrument panel 16, in a state of being inclined with respect to the horizontal direction. Namely, the airbag device 10 for a passenger's seat is made to be a mid-mount type airbag device in which the airbag module 18 is disposed toward the rear of the vehicle, as compared with a so-called top mount type airbag device in which the airbag module 18 is disposed at a substantially flat top surface 16D of the vehicle front portion of the instrument panel 16.

Concretely, the airbag case 24 is held by the mounting portion 16B in a posture in which the opening portion of the airbag case 24 is directed both toward the vehicle rear side and upper side, and, as shown by the two-dot chain line in FIG. 1, holds (accommodates a portion of) the airbag 20 that is in a folded-up state. The folded-up state is maintained due to the airbag 20 being enveloped by a holding sheet or the like that is not illustrated. The inflator 22 is fixedly held by the airbag case 24 in a state in which a portion of the inflator 22, that includes gas jetting ports 22A, is inserted within the airbag 20. In this embodiment, the inflator 22 is a so-called disc-type inflator, and a sufficient volume is ensured with respect to the airbag 20 that has reaction force supporting tubes 28 within an outer bag 26 as is described hereafter.

The airbag 20 has the outer bag 26 that serves as a first bag, and the reaction force supporting tubes 28 that serve as second bags. The outer bag 26 is inflated and expanded at the vehicle front side with respect to the upper body U of the passenger P, and restrains movement of the upper body U toward the front of the vehicle. At the time of restraining the upper body U, the outer bag 26 contacts (is pushed against) the windshield glass 14 and the instrument panel 16 respectively, as shown in FIG. 1.

In this embodiment, as shown in FIG. 2 and FIG. 3, the outer bag 26 is an airbag of a so-called twin chamber structure as if left and right bags that are adjacent in the vehicle transverse direction are connected. The outer bag 26 is formed such that the vehicle rear ends of the left and right bags (chambers) respectively restrain the left and right separate shoulder portions (or vicinities thereof) of the seated passenger P. In this embodiment, a vent hole 25 for internal pressure adjustment is formed in the outer bag 26.

The reaction force supporting tubes 28 are provided within the outer bag 26 so as to be inflated and expanded in independent tube shapes that are long in the vehicle vertical direction, at the vehicle front portion within the outer bag 26, by a base cloth that is separate from the base cloth that structures the outer bag 26. In this expanded state, upper end portions 28A in the vehicle vertical direction of the reaction force supporting tubes 28 face the windshield glass 14 at the vehicle rear side thereof, and lower end portions 28B in the vehicle vertical direction face the instrument panel 16 at the vehicle rear side thereof. Accordingly, in the state in which the outer bag 26 restrains the upper body U of the passenger P, the reaction force supporting tubes 28 are pushed against the instrument panel 16 and the windshield glass 14. Due to the reaction force supporting tubes 28, there is a structure in which a portion of the reaction force, that arises accompanying the restraining of the upper body U by the outer bag 26, is supported. Note that a weave sealing processing such as silicon coating or the like may be carried out on the base cloth that structures the reaction force supporting tubes 28.

In this embodiment, as shown in FIG. 2 and FIG. 3, plural (two of the) reaction force supporting tubes 28 are provided so as to be lined up in the vehicle transverse direction. The respective reaction force supporting tubes 28 are disposed substantially symmetrically to the left and the right such that the upper end portions 28A are greatly separated in the vehicle transverse direction as compared with the lower end portions 28B. Namely, the two reaction force supporting tubes 28 are disposed so as to form a "V" shape. In other words, the two reaction force supporting tubes 28 are disposed such that both outer edges in the vehicle transverse direction of the in-bag expanding portions that are formed by the two reaction force supporting tubes 28 form a "V" shape. In this embodiment, the left and right upper end portions 28A are joined, by sewing or the like, to portions that are peak portions in plan view of the bag, at the left and right corresponding sides that are a twin-chamber structure as described above.

Further, the airbag 20 has an inner tube 30 that serves as a gas flow path member that is for supplying gas of the inflator 22 directly to outer bag 26 and the reaction force supporting tubes 28, respectively. The inner tube 30 is formed by a base cloth, that is separate from the base cloths that structure the outer bag 26, the reaction force supporting tubes 28, and is provided so as to be inflated and expanded within the outer bag 26. The inner tube 30 has a gas entrance 30A into which gas of the inflator 22 is supplied (flows-in) gas exits 30B that open to the outer bag 26 interior, and gas exits 30C that open to the reaction force supporting tube 28 interiors.

As shown in FIG. 1, the gas entrance 30A is the gas entrance of the overall airbag 20, and can also be interpreted as being a structure that is positioned at the outer side of the outer bag 26. As shown in FIG. 2 and FIG. 3, the gas exits 30B are provided at both sides in the vehicle transverse direction of the inner tube 30. Accordingly, the airbag 20 is structured such that gas is supplied to the outer bag 26 from the inner tube 30 toward the vehicle transverse direction both sides.

Further, as shown in FIG. 2 and FIG. 3, the lower end portion 28B sides of the respective reaction force supporting tubes 28 are joined in a sealed state by sewing or the like to the inner tube 30 so as to surround the gas exits 30C. Due thereto, the inner tube 30 and the reaction force supporting tubes 28 are communicated only through the gas exits 30C. In this embodiment, the gas exit 30C is provided for each of the reaction supporting tubes 28, and the respective reaction force supporting tubes 28 are communicated through the respectively corresponding gas exits 30C.

Further, at the airbag device 10 for a passenger's seat, one-way valves (check valves) 32, that serve as gas discharge suppressing structures and structure internal pressure difference imparting structures, are formed at the gas exits 30C of the inner tube 30. The one-way valves 32 have cloth pieces 32A that cover the gas exits 30C from the reaction force supporting tube 28 interiors (the outer side of the inner tube 30), and permit the supply of gas from the inner tube 30 through the gas exits 30C to the reaction force supporting tubes 28. On the other hand, the one-way valves 32 are structured such that, when the internal pressure (dynamic pressure) of the reaction force supporting tubes 28 becomes higher than the internal pressure of the inner tube 30, the cloth pieces 32A close the gas exits 30C by the internal pressure.

Accordingly, at the airbag device 10 for a passenger's seat, the gas within the reaction force supporting tubes 28 being discharged is suppressed. Namely, the airbag 20 is structured such that, at least in the state in which the outer bag 26 restrains the upper body U, the internal pressure of the reaction force supporting tubes 28 from which gas is not discharged becomes a higher pressure than the internal pressure of the outer bag 26 from which gas is discharged from the vent hole 25 accompanying this restraining. Namely, the spaces of the reaction force supporting tube 28 interiors are structures that are made to be high-pressure chambers (high-pressure portions) whose pressure is high as compared with the other spaces of the outer bag 26 interior.

Further, at the airbag device 10 for a passenger's seat, as shown in FIG. 1, airbag doors 34, that are ruptured and open due to the inflation and expansion pressure of the airbag 20, are formed at the portion where the airbag module 18 is mounted at the instrument panel 16. Due to the instrument panel 16 being torn-open along groove-shaped tear lines that are formed at the inner surface side thereof, the airbag doors 34 relating to this embodiment are expanded upward and downward around hinge portions, and form an opening in the instrument panel 16. The inflation and expansion of the airbag 20 toward the instrument panel 16 exterior, i.e., toward the vehicle cabin C, are permitted through this opening.

In the above-described airbag device 10 for a passenger's seat, when a front collision of the automobile V is detected or a front collision being unavoidable is predicted on the basis of output of an unillustrated collision sensor for example, an unillustrated airbag ECU serving as a control device causes the inflator 22 to operate.

Operation of the present embodiment is described next.

In the airbag device 10 for a passenger's seat of the above-described structure, when a front collision of the automobile V is detected or predicted on the basis of a signal from the collision sensor, the airbag ECU causes the inflator 22 to operate (ignite). Thus, the airbag 20 that receives the gas supply from the inflator 22 is inflated within the instrument panel 16, and due to the expansion pressure thereof, expands the airbag doors 34 and passes through the formed opening and is inflated and expanded at the vehicle cabin C.

At this time, the inner tube 30, to which gas of the inflator 22 is supplied from the gas entrance 30A, is first inflated and expanded. The gas that has passed through the inner tube 30 is supplied from the gas exits 30B to the outer bag 26 as shown by arrows G in FIG. 2, and is supplied from the gas exits 30C to the reaction force supporting tubes 28. Thus, the outer bag 26 and the reaction force supporting tubes 28 are respectively inflated and expanded due to the gas pressure.

When the upper body U of the passenger P is moved relatively toward the front of the vehicle due to inertia caused by the front collision, the upper body U contacts the outer bag 26, and the movement toward the front of the vehicle is restrained by the outer bag 26. At this time, the respective reaction force supporting tubes 28 receive pushing force toward the front of the vehicle via the outer bag 26, and the upper end portions 28A are pushed against the windshield glass 14, and the lower end portions 28B are pushed against the instrument panel 16. Due thereto, when the internal pressure of the reaction force supporting tubes 28 increases, due to that pressure, the cloth pieces 32A are pushed against the surface of the inner tube 30 and the gas exits 30C are closed, and discharging of gas from the reaction force supporting tubes 28 is prevented or suppressed. Namely, at the reaction force supporting tubes 28, accompanying the restraining of the upper body U, the internal pressure becomes high as compared with the outer bag 26 at which gas slips out from the vent hole 25, and high internal pressure is maintained.

Due thereto, the reaction force of the restraining of the upper body U by the outer bag 26 of the airbag 20 is supported by the frictional force F between the outer bag 26, and the windshield glass 14 and the instrument panel 16, and by the interference between the respective reaction force supporting tubes 28, and the windshield glass 14 and the instrument panel 16. The reaction force supporting by the interference between the respective reaction force supporting tubes 28, and the windshield glass 14 and the instrument panel 16, can also be interpreted as support due to an engaging (stopper) function that is due to the portion, where rigidity is high due to high internal pressure, interfering with the vehicle body, and further can also be interpreted as support due to large frictional force that is due to large frictional resistance that is based on high internal pressure.

Further, as described above, at the airbag device 10 for a passenger's seat, a portion of the supported reaction force of the upper body U is supported by the interference between the reaction force supporting tubes 28, and the windshield glass 14 and the instrument panel 16. Therefore, at the airbag device 10 for a passenger's seat, the portion of reaction force supporting that is borne by the above-described frictional force F is reduced, and, as compared with an airbag that does not have the reaction force supporting tubes 28, the volume of the outer bag 26 can be reduced.

This point is supplementarily described hereinafter. As described above, at the outer bag 26, the reaction force at the time of restraining the upper body U is supported (displacement toward the front of the vehicle is restricted) by the frictional force F with the windshield glass 14, the instrument panel 16. On the other hand, in order to suppress the load at the time of restraining the upper body U, the frictional force cannot be ensured by the internal pressure (frictional resistance) of the outer bag 26 being made to be high. Therefore, in a structure that does not have the reaction force supporting tubes 28, the frictional force must be ensured by making the contact surface area between an airbag 100, that is shown by the two-dot chain line in FIG. 1, and the windshield glass 14, the instrument panel 16 be relatively wide, and it is difficult to greatly reduce the volume of the airbag (the inflator 22).

In contrast, at the airbag 20, because a portion of the reaction force at the time of restraining the upper body U of the passenger P is supported by the reaction force supporting tubes 28, the reaction force that is to be supported by the frictional force F at the outer bag 26 is reduced as described above. Therefore, the contact surface area of the outer bag 26 with the windshield glass 14, the instrument panel 16 can be reduced, and the volume thereof can be greatly reduced as compared with the volume of the airbag 100. In this embodiment, as shown in FIG. 1, contact surface areas $A_{26g}$, $A_{26i}$ of the outer bag 26 with the windshield glass 14, the instrument panel 16 are greatly reduced as compared with contact surface areas $A_{100g}$, $A_{100i}$ of the airbag 100 with the windshield glass 14, the instrument panel 16. Further, because the reaction force supporting tubes 28 and the inner tube 30 are expanded within the outer bag 26, in other words, because the reaction force supporting tubes 28 and the inner tube 30 function in the range of the volume of the outer bag 26, the volume of the airbag 20 overall is reduced as compared with the airbag 100. Further, the reduction in the volume of the airbag 20 contributes also to a reduction in the volume of the inflator 22.

In this way, the present airbag device 10 for a passenger's seat contributes to reducing the volume of the airbag 20.

Further, at the airbag device 10 for a passenger's seat, as described above, the reaction force supporting tubes 28 bear a portion of the supported reaction force at the time of restraining the upper body U of the passenger P, and therefore, in addition to reducing the volume of the outer bag 26, it is also possible to reduce the inner pressure of the outer bag 26 and reduce the restraining load of the seated passenger P.

Moreover, at the airbag device 10 for a passenger's seat, because the pair of the left and right reaction force supporting tubes 28 are expanded so as to form a substantial "V" shape, the reaction force that accompanies the restraining of the upper body U of the passenger P by the outer bag 26 is supported in a form that is near three-point support. Due thereto, the outer bag 26 can be supported in a stable posture via the reaction force supporting tubes 28, and the posture of restraining the upper body U of the passenger P by the outer bag 26 is stable.

Still further, at the airbag device 10 for a passenger's seat, the inner tube 30 that supplies gas directly to the outer bag 26, the reaction force supporting tubes 28 is provided, and the one-way valves 32 are provided at the gas exits 30C of the inner tube 30. Therefore, by a simple structure, the reaction force supporting tubes 28 can be made to be high pressure as compared with the outer bag 26 at least at the time of restraining the upper body U.

Further, at the airbag device 10 for a passenger's seat, gas is supplied (blown-out) through the pair of left and right gas exits 30I3 of the inner tube 30 toward the vehicle transverse direction both sides at the outer bag 26 interior. Therefore, as compared with a structure in which gas is supplied toward the rear of the vehicle within the outer bag 26, the expansion force (expansion speed) of the outer bag 26 toward the rear of the vehicle is suppressed, and the load is reduced at the time of restraining the upper body U of the seated passenger P.

Other embodiments of the present invention are described next. Note that parts/portions that are basically the same as the structures of the above-described first embodiment or that were previously described are denoted by the same reference numerals as the structures of the above-described first embodiment or the structures that were previously described, and description thereof is omitted.

Second Embodiment

Figure 4:
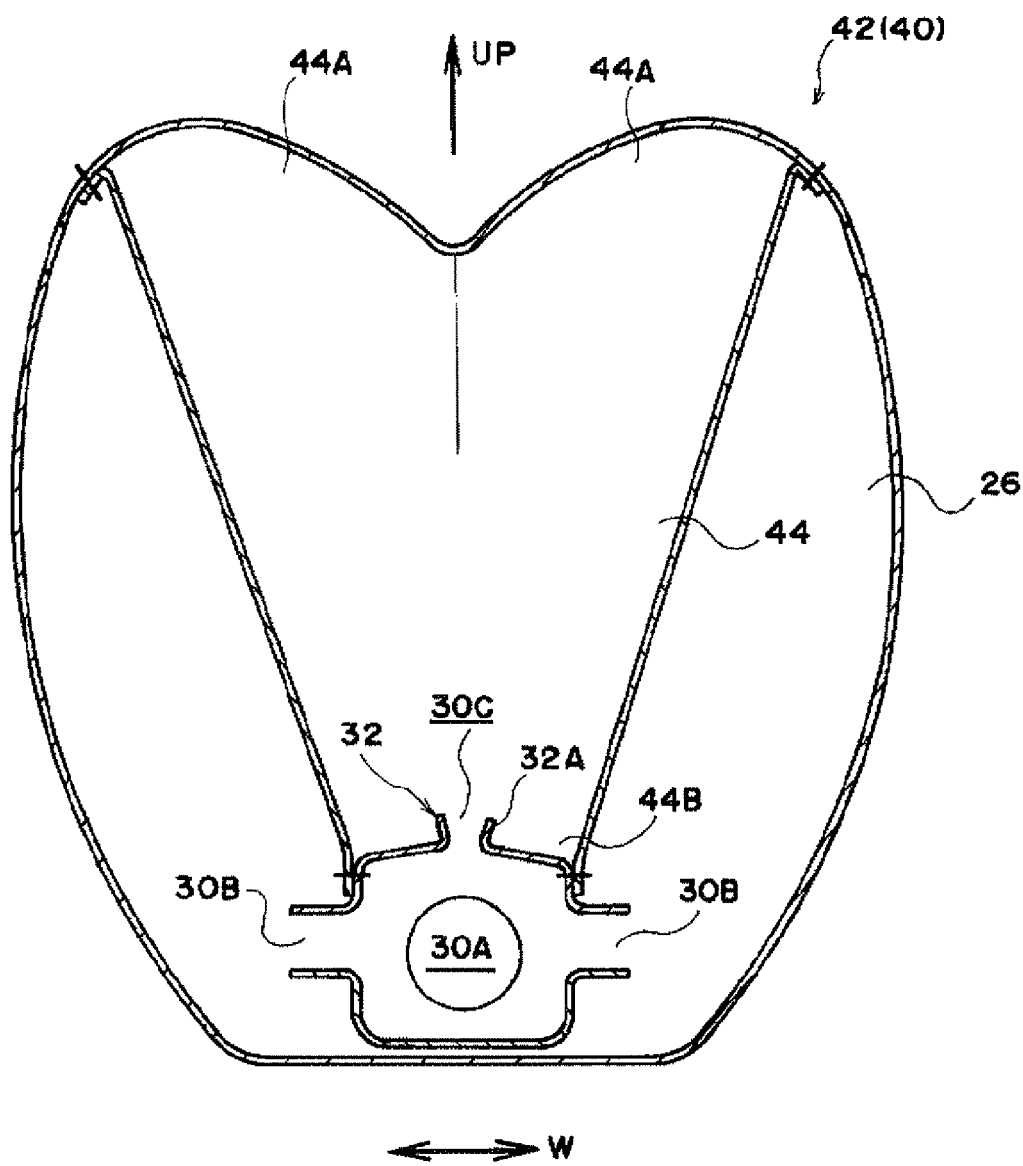
FIG. 4 is a front sectional view of an airbag that structures an airbag device for a passenger's seat relating to a second embodiment of the present invention.

An airbag 42 that structures an airbag device 40 for a passenger's seat relating to a second embodiment of the present invention is shown in FIG. 4 in a front sectional view corresponding to FIG. 2. As shown in this drawing, the airbag 42 of the airbag device 40 for a passenger's seat has a single reaction force supporting tube 44 instead of the plural reaction force supporting tubes 28. The airbag device 40 for a passenger's seat differs from the airbag device 10 for a passenger's seat relating to the first embodiment with regard to this point.

As shown in FIG. 4, a lower end portion 44I3 in the vehicle vertical direction of the reaction supporting tube 44 is communicated, in a sealed state by sewing or the like, with the upper end of the inner tube 30, and is communicated with the inner tube 30 via the gas exit 30C. On the other hand, an upper end portion 44A in the vehicle vertical direction of the reaction force supporting tube 44 is joined by sewing or the like to portions that form the ceiling in the expanded state at the outer bag 26.

In FIG. 4, an example is illustrated in which the base cloth of the ceiling portion is commonly used at the outer bag 26 and the reaction force supporting tube 44, but the reaction force supporting tube 44 may have an independent ceiling (may be formed as an independent bag-body) in the same way as the reaction force supporting tubes 28. This reaction force supporting tube 44 is folded-up together with other structural portions of the airbag 42 (mainly the outer bag 26, the inner tube 30), and is accommodated in the airbag case 24.

Further, the reaction force supporting tube 44 is a structure in which, in the inflated and expanded state thereof, the lower end portion 44B in the vehicle vertical direction opposes the instrument panel 16 at the vehicle rear side thereof, and the upper end portion 44A in the vehicle vertical direction opposes the windshield glass 14 at the vehicle rear side thereof. The thickness in the vehicle longitudinal direction, in side view, of the reaction force supporting tube 44 in this expanded state is equivalent to the reaction force supporting tubes 28, and the reaction force supporting tube 44 overall is expanded in a flat plate shape that is thin toward the front and the rear.

On the other hand, the vehicle transverse direction both edges of the reaction force supporting tube 44 have a substantial "V" shape at which the interval widens gradually from the vehicle lower end toward the upper end in front view. In other words, the reaction force supporting tube 44 forms an inverted triangle shape or an inverted trapezoid shape in front view. The other structures at the airbag device 40 for a passenger's seat, including portions that are not illustrated, are basically the same as the corresponding structures of the airbag device 10 for a passenger's seat.

Accordingly, by the airbag device 40 for a passenger's seat relating to the second embodiment as well, similar effects can be obtained by operation that is basically similar to the airbag device 10 for a passenger's seat relating to the first embodiment. Further, at the airbag device 40 for a passenger's seat, because the vehicle transverse direction both edges of the reaction force supporting tube 44 are expanded so as to form a substantial "V" shape, the reaction force, that accompanies the restraining of the upper body U of the passenger P by the outer bag 26, is supported in a form that is near three-point support. Due thereto, the outer bag 26 can be supported in a stable posture via the single reaction force supporting tube 44, and the posture of restraining the upper body U restraining of the passenger P by the outer bag 26 is stable.

Third Embodiment

Figure 5:
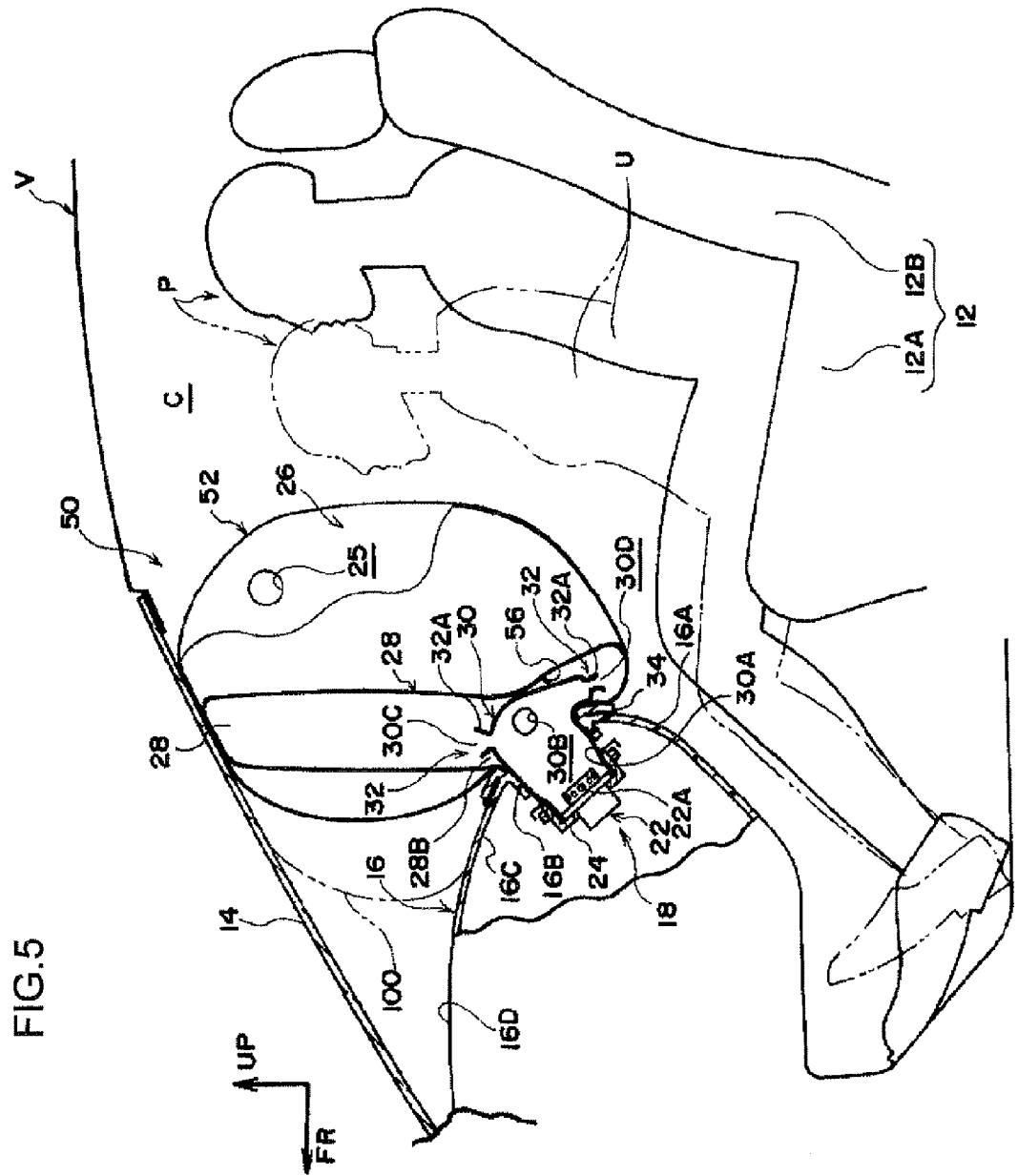
FIG. 5 is a side sectional view schematically showing an airbag expanded state at an airbag device for a passenger's seat relating to a third embodiment of the present invention.
Figure 6:
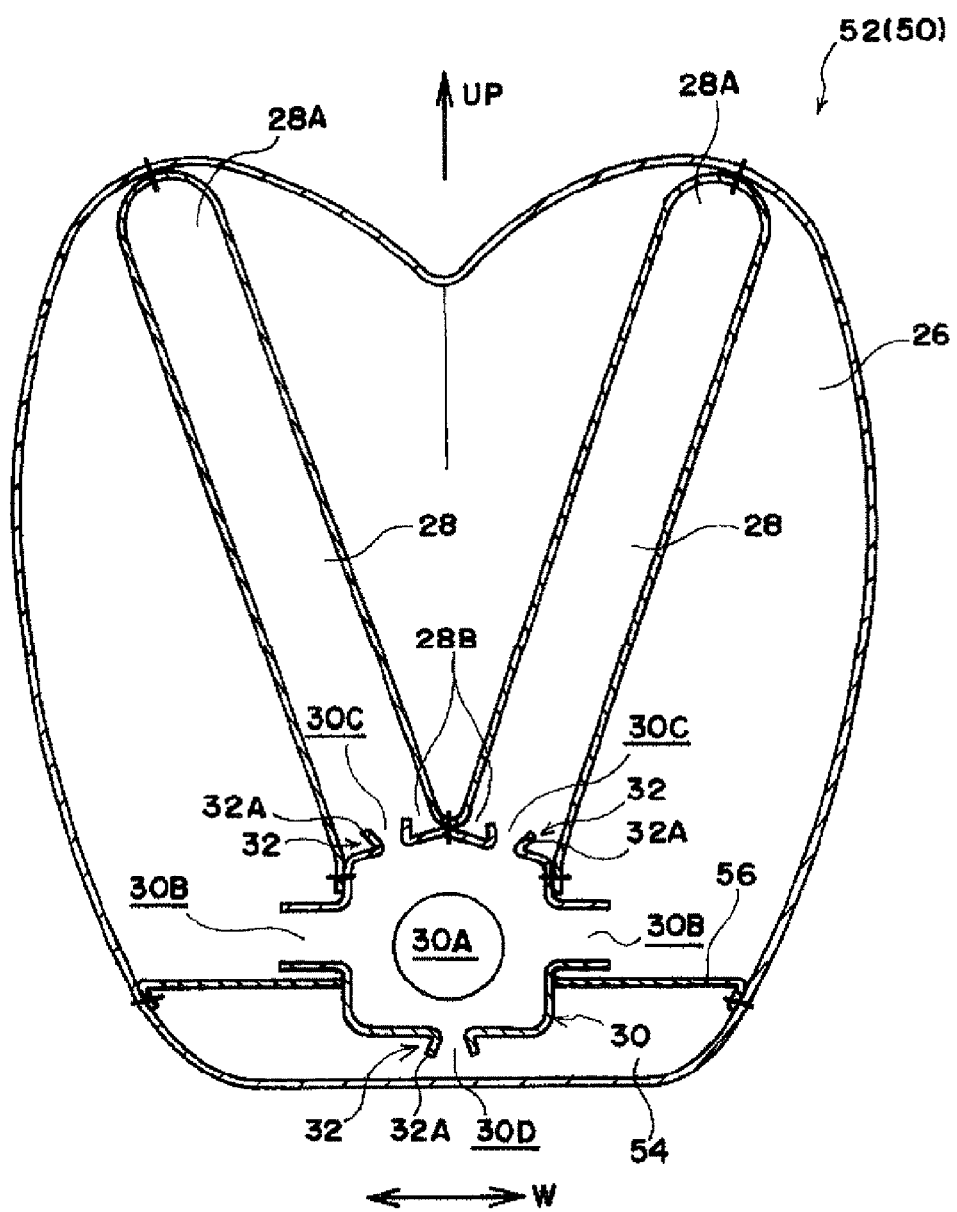
FIG. 6 is a front sectional view of an airbag that structures the airbag device for a passenger's seat relating to the third embodiment of the present invention.

An operated state of an airbag device 50 for a passenger's seat relating to a third embodiment of the present invention is shown in a schematic side sectional view in FIG. 5. Further, an airbag 52 that structures the airbag device 50 for a passenger's seat is shown in FIG. 6 in a front sectional view corresponding to FIG. 2. As shown in these drawings, the airbag 52 of the airbag device 50 for a passenger's seat has, in addition to the reaction force supporting tubes 28, a reaction force supporting bag 54 that serves as a third bag and that is inflated and expanded at the vehicle lower side with respect to the outer bag 26. The airbag device 50 for a passenger's seat differs from the airbag device 10 for a passenger's seat, that has the airbag 20 that does not have the reaction force supporting bag 54, with regard to this point.

In this embodiment, the reaction force supporting bag 54 is provided so as to occupy the space at the lower front end of the outer bag 26. Concretely, due to spaces above and below a partitioning cloth 56 being demarcated by the partitioning cloth 56, (the chamber of) the reaction force supporting bag 54 is formed at the lower end portion of the outer bag 26. In the example of FIG. 6, an example is shown in which a base cloth is commonly used by the reaction force supporting bag 54 and the outer bag 26, but the reaction force supporting bag 54 may be formed as an independent bag-body that is provided within the outer bag 26.

This reaction force supporting bag 54 is communicated with the inner tube 30 via a gas exit 30D that is formed at the lower end portion of the inner tube 30 that passes-through the partitioning cloth 56. Further, a one-way valve 32 is provided at the periphery of the gas exit 30D at the inner tube 30, so as to close when the internal pressure of the reaction force supporting bag 54 becomes higher than the internal pressure of the inner tube 30.

The above-described reaction force supporting bag 54 is folded-up together with other structural portions of the airbag 52 (mainly the outer bag 26, the reaction force supporting tubes 28, the inner tube 30), and is accommodated in the airbag case 24. The other structures at the airbag device 50 for a passenger's seat, including portions that are not illustrated, are basically the same as the corresponding structures of the airbag device 10 for a passenger's seat.

Accordingly, by the airbag device 50 for a passenger's seat relating to the third embodiment as well, similar effects can be obtained by operation that is basically similar to the airbag device 10 for a passenger's seat relating to the first embodiment. Further, at the airbag device 50 for a passenger's seat, when the inflator 22 is operated, gas is supplied to the reaction force supporting bag 54 through the inner tube 30, and the reaction force supporting bag 54 is inflated and expanded. When the internal pressure of the reaction force supporting bag 54 becomes a higher pressure than the internal pressure of the inner tube 30, the one-way valve 32 closes, and the internal pressure of the reaction force supporting bag 54 is maintained high. Due thereto, at the airbag device 50 for a passenger's seat, at the lower front end of the outer bag 26, the high-pressure reaction force supporting bag 54 is expanded and interferes with the instrument panel 16, and therefore, due to this interference as well, a portion is supported by the reaction force that accompanies restraining of the upper body U. Namely, the shared burden of the reaction force, that accompanies the restraining of the passenger by the frictional force F of the outer bag 26, can be further reduced.

Due thereto, the airbag device 50 for a passenger's seat contributes to a further reduction in the volume of the airbag 52.

Note that, in the third embodiment, an example is shown in which the airbag 52 has the pair of reaction force supporting tubes 28, but the present invention is not limited to this, and, for example, the airbag 52 may be structured to have the single reaction force supporting tube 44 instead of the pair of reaction force supporting tubes 28.

Fourth Embodiment

Figure 7:
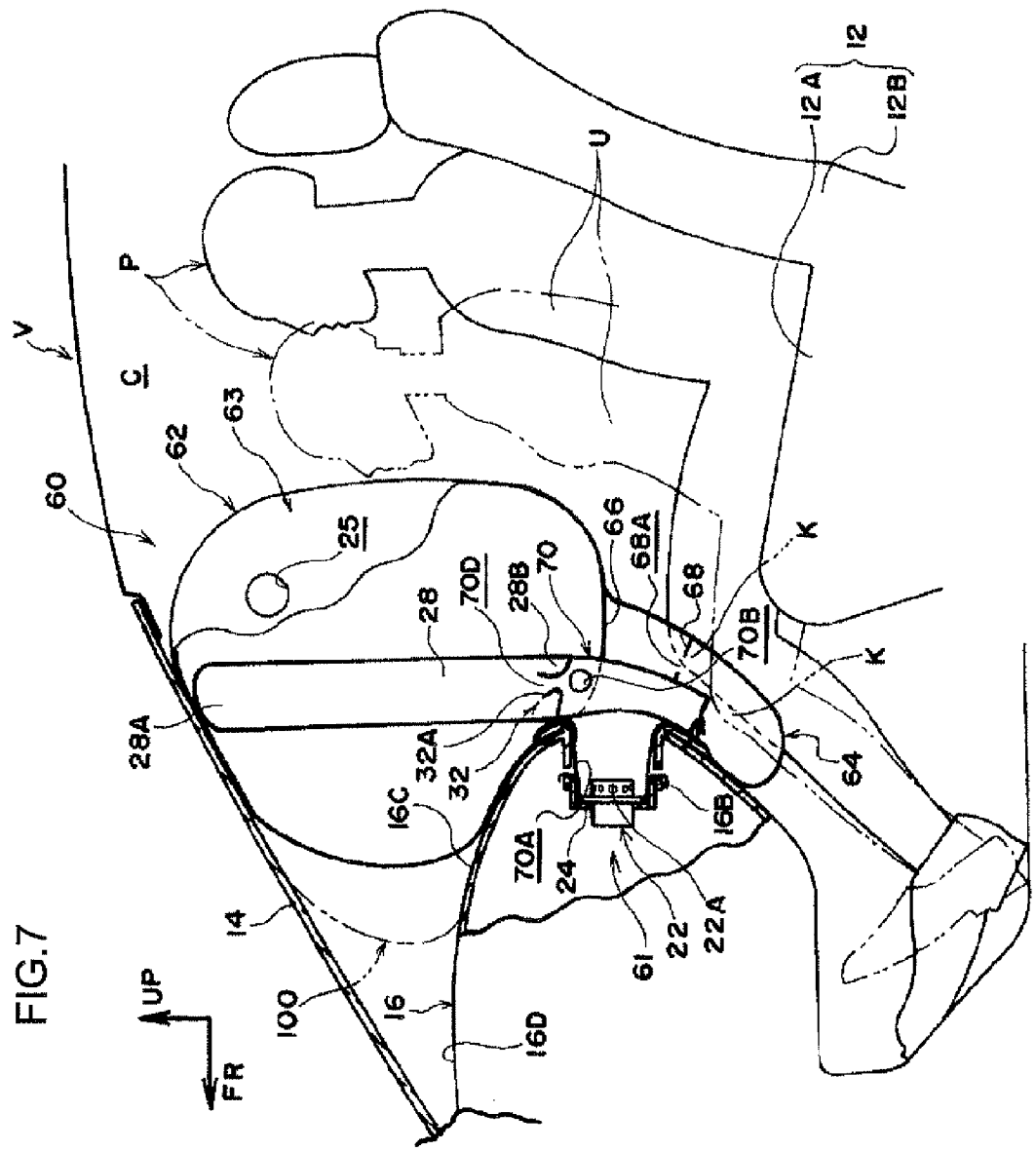
FIG. 7 is a side sectional view schematically showing an airbag expanded state at an airbag device for a passenger's seat relating to a fourth embodiment of the present invention.
Figure 8:
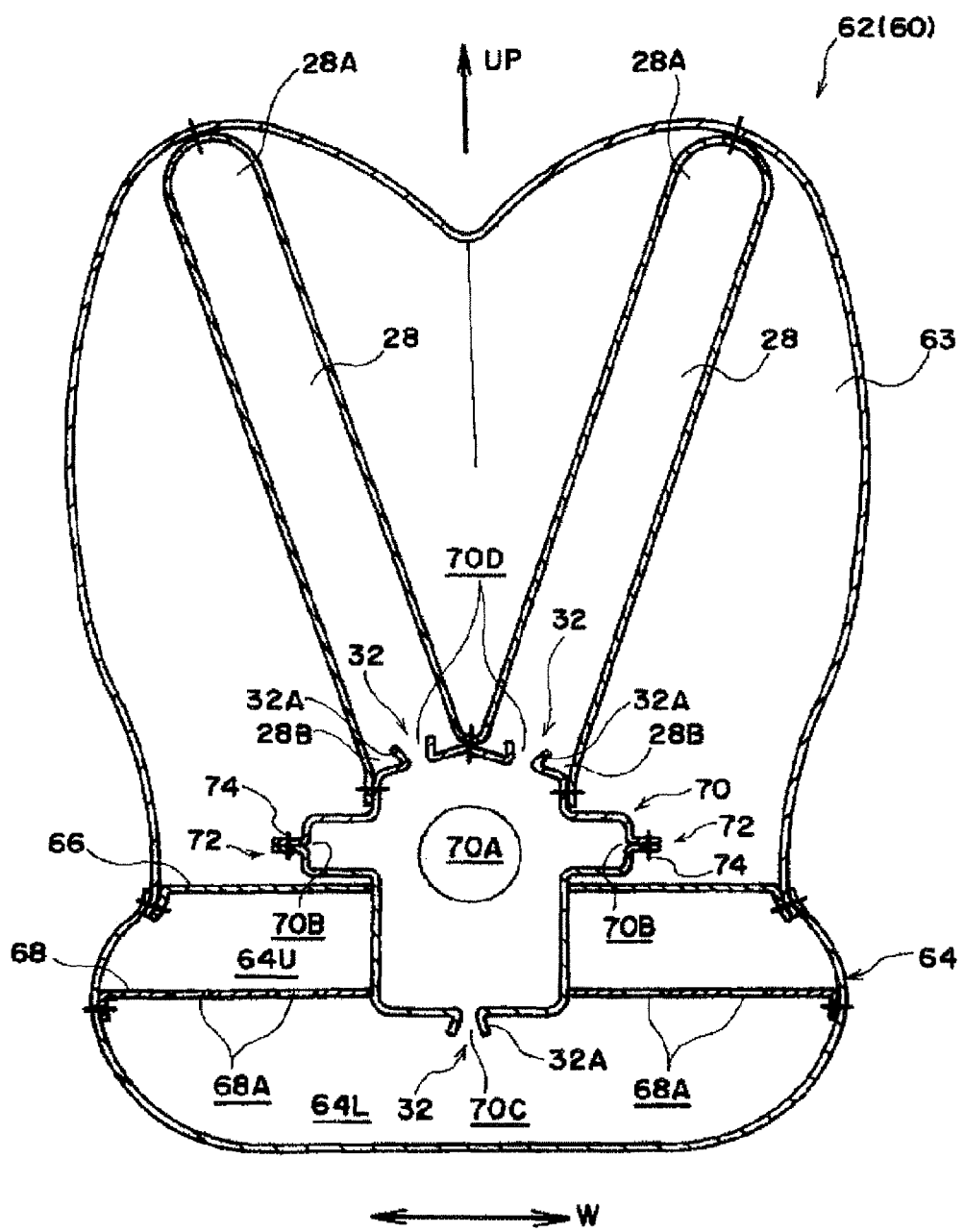
FIG. 8 is a front sectional view of an airbag that structures the airbag device for a passenger's seat relating to the fourth embodiment of the present invention.

An operated state of an airbag device 60 for a passenger's seat relating to a fourth embodiment of the present invention is shown in FIG. 7 in a schematic side sectional view corresponding to FIG. 1. Further, an airbag 62 that structures the airbag device 60 for a passenger's seat is shown in FIG. 8 in a front sectional view corresponding to FIG. 2. As shown in these drawings, the airbag 62 of the airbag device 60 for a passenger's seat has, in addition to a main bag 63 that serves as a first bag, a sub-bag (knee airbag) 64 that serves as a third bag. The airbag device 60 for a passenger's seat differs from the airbag device 10 for a passenger's seat, that has the airbag 20 that does not have the sub-bag 64, with regard to this point. Concrete description is given hereinafter.

An airbag module 61 that structures the airbag device 60 for a passenger's seat is provided in a vicinity of the vehicle rearmost portion of the instrument panel 16, such that the airbag case 24 is opened substantially rearward in the vehicle longitudinal direction. Due thereto, the airbag 62, that has the main bag 63 and the sub-bag 64, is expanded well. Namely, the airbag device 60 for a passenger's seat relating to this embodiment is made to be a so-called rear mount type airbag device for a passenger's seat. The main bag 63 is structured similarly to the outer bag 26 at the airbag device 10 for a passenger's seat.

The sub-bag 64 is formed in the shape of a bag that opens toward the top of the vehicle, by a base cloth that is different than the base cloth that forms the main bag 63, and the opening edge is joined by sewing or the like to the vehicle lower side opening edge of the main bag 63. Due thereto, the airbag 62 forms a large bag shape on the whole. The sub-bag 64 differs from the main bag 63 with regard to the point that a weave sealing processing such as silicon coating or the like is carried out on the surface of the base cloth thereof, and gas leaks from the main bag 63 interior through the weave thereof are prevented (suppressed). From the standpoint of workability, silicon coating for maintaining the internal pressure of the sub-bag 64 may be carried out on the outer surface of the sub-bag 64, and, from the standpoint of preventing gas leaks, it is preferable to carry out silicon coating for maintaining the internal pressure of the sub-bag 64 on the inner surface of the sub-bag 64.

The airbag 62, that is expanded in the shape of a large bag on the whole as described above, has a tether 66 for demarcating (separating) the interior of the airbag 62 into the chamber of the main bag 63 and the chamber of the sub-bag 64. The tether 66 forms a strip shape, and, as shown in FIG. 1, limits the expansion length in the vehicle longitudinal direction of the sub-bag 64. In this embodiment, the tether 66 is joined by sewing or the like to the sewn portion of the main bag 63 and the sub-bag 64.

Moreover, a tether 68 serving as a partitioning cloth is provided at the portion that becomes the substantially intermediate portion in the vehicle vertical direction in the expanded state at the sub-bag 64 interior. The tether 68 forms two chambers 64U, 64L that are demarcated in the vehicle vertical direction within the chamber of the sub-bag 64, and, as shown in FIG. 1, limits the inflation in the vehicle longitudinal direction of the sub-bag 64. Communication holes 68A, that serve as plural communication paths for communicating the chambers 64U, 64L, are formed in the tether 68.

Further, the airbag 62 has, instead of the inner tube 30, an inner tube 70 serving as a gas flow path member. The inner tube 70 is formed as a tube body independently from the main bag 63, the reaction force supporting tubes 28, and the sub-bag 64, and has a gas entrance 70A through which gas of the inflator 22 is supplied (flows-in), gas exits 70B that open within the main bag 63, a gas exit 70C that opens within the sub-bag 64, and gas exits 70D that open within the reaction force supporting tubes 28. Within the main bag 63 and the sub-bag 64, the inner tube 70 is folded-up together with the main bag 63, the sub-bag 64 and the reaction force supporting tubes 28, so as to be inflated and expanded mainly within the main bag 63 and the sub-bag 64.

The inner tube 70 passes-through the tether 66 in a sealed state by sewing or the like, and the gas exits 70B are positioned within the main bag 63, and the gas exit 70C is positioned within the sub-bag 64. Due thereto, at the airbag 20, through the inner tube 70, gas from the inflator 22 is directly supplied to the main bag 63 through the gas exits 70B, and gas from the inflator 22 is directly supplied to the sub-bag 64 through the gas exit 70C.

Further, in this embodiment, the inner tube 70 also passes-through the tether 68, and is structured such that gas from the inflator 22 is directly supplied to the chamber 64L through the gas exit 70C. The one-way valve 32 is provided at the periphery of the gas exit 70C at the inner tube 70, so as to close when the internal pressure of the sub-bag 64 becomes higher than the internal pressure of the inner tube 70. Further, at the airbag device 60 for a passenger's seat, in the same way as the airbag device 10 for a passenger's seat, the one-way valves 32 are provided at the peripheries of the respective gas exits 70D, so as to close when the internal pressure of the respective reaction force supporting tubes 28 becomes higher than the internal pressure of the inner tube 70.

Moreover, the airbag device 10 for a passenger's seat has outer bag expansion delaying structures 72 serving as communication delaying structures. The outer bag expansion delaying structures 72 are structured with the main portions thereof being tear seams 74 that respectively close, by sewing, the formed portions of the respective gas exits 70B. When the internal pressure of the inner tube 70 exceeds a predetermined value, the tear seams 74 are ruptured and open the corresponding gas exits 70B. Due thereto, the airbag device 10 for a passenger's seat is structured such that the timing of starting the supply of gas to the main bag 63 is delayed with respect to the timing of starting the supply of gas to the sub-bag 64. In other words, the sub-bag 64 is structured so as to be expanded before the main bag 63.

The other structures at the airbag device 60 for a passenger's seat, including portions that are not illustrated, are basically the same as the corresponding structures of the airbag device 10 for a passenger's seat.

Accordingly, by the airbag device 60 for a passenger's seat relating to the fourth embodiment as well, similar effects can be obtained by operation that is basically similar to the airbag device 10 for a passenger's seat relating to the first embodiment. Hereinafter, mainly the portions, in the operation of the airbag device 60 for a passenger's seat, that differ from the operation of the airbag device 10 for a passenger's seat, are described.

In the airbag device 60 for a passenger's seat of the above-described structure, when a front collision of the automobile V is detected or predicted on the basis of a signal from the collision sensor, the airbag ECU causes the inflator 22 to operate (ignite). Thus, the airbag 62 that receives the gas supply from the inflator 22 is inflated within the instrument panel 16, and due to the expansion pressure thereof, expands the airbag doors 34 and passes through the fowled opening and is inflated and expanded at the vehicle cabin C.

Figure 9:
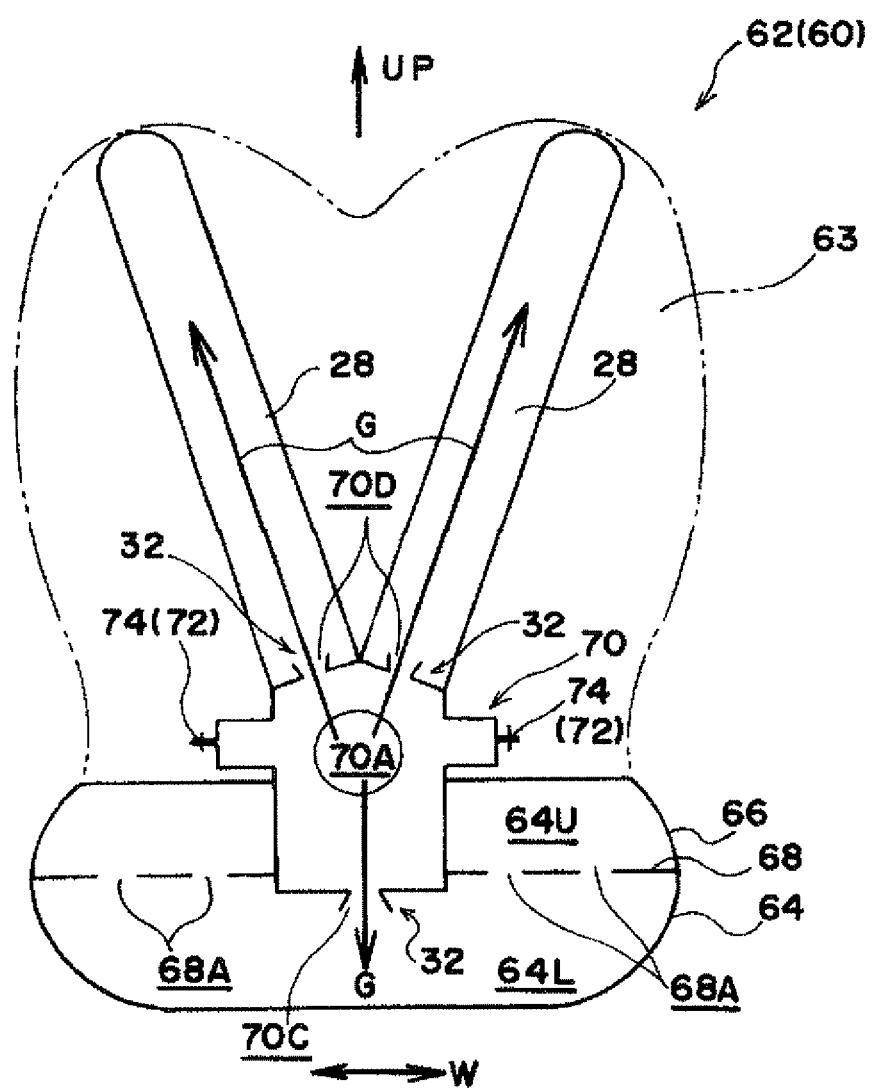
FIG. 9 is a front sectional view schematically showing a gas supplied state to a sub-bag of the airbag that structures the airbag device for a passenger's seat relating to the fourth embodiment of the present invention.

At this time, the inner tube 70, to which gas of the inflator 22 is supplied from the gas entrance 70A, is first inflated and expanded, and the gas that has passed through the inner tube 70 is supplied from the gas exit 70C to the chamber 64L of the sub-bag 64 as shown in FIG. 9 (refer to arrow G). Thus, the sub-bag 64 is inflated and expanded from the chamber 64L at the distal end side (the lower side). Further, the sub-bag 64 is inflated and expanded also at the chamber 64U side by the gas that is supplied from the chamber 64L at the lower side through the plural communication holes 68A to the chamber 64U at the upper side. Due thereto, at the airbag device 60 for a passenger's seat, expansion of the sub-bag 64 is completed in a short time from the detection of a front collision.

Figure 10:
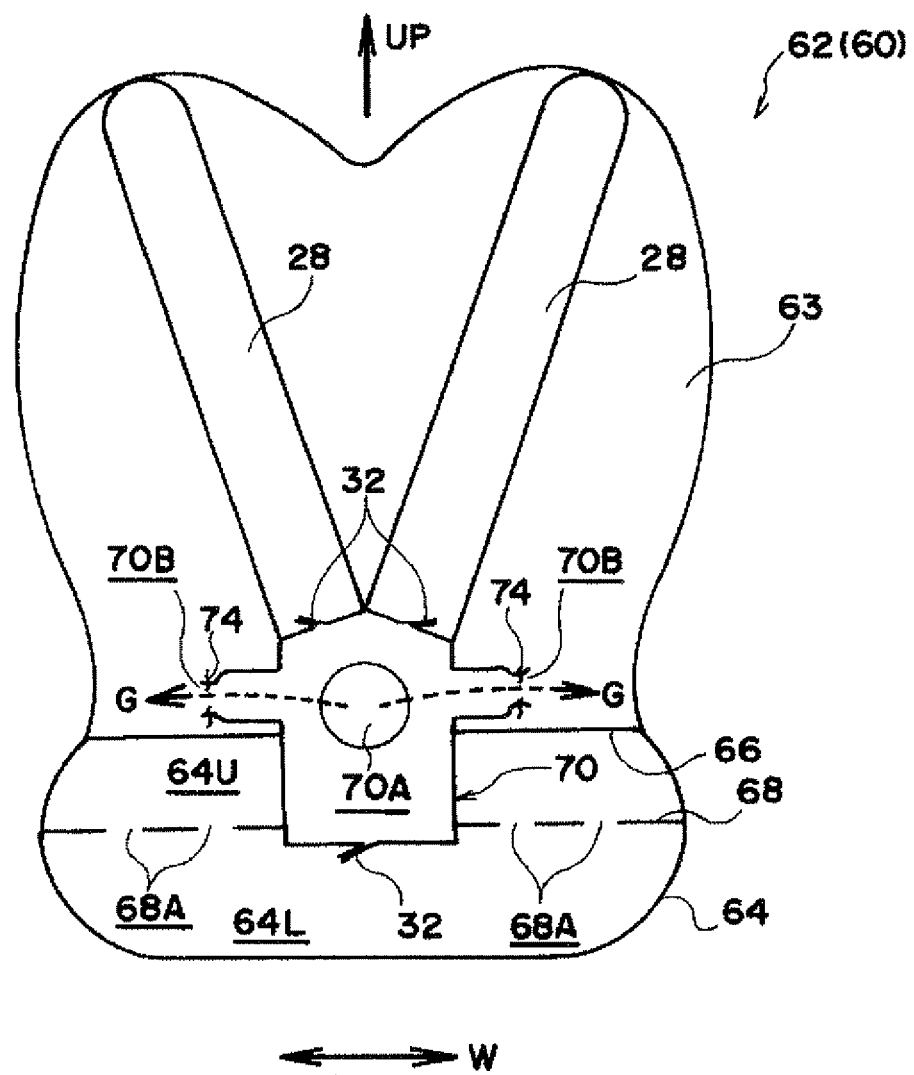
FIG. 10 is a front sectional view schematically showing a gas supplied state to an outer bag of the airbag that structures the airbag device for a passenger's seat relating to the fourth embodiment of the present invention.

On the other hand, when the internal pressure of the inner tube 70 exceeds a predetermined value in the process of expansion or after completion of expansion of the sub-bag 64, the tear seams 74 are ruptured, and, as shown in FIG. 10, the gas exits 70B are opened. The gas of the inflator 22 is supplied from the gas exits 70B to the main bag 63 (refer to arrows G), and the main bag 63 is inflated and expanded.

Here, in the airbag device 60 for a passenger's seat, the inner tube 70 is provided at the airbag 62 that has the main bag 63 and the sub-bag 64. Therefore, in the airbag device 60 for a passenger's seat, gas from the inflator 22 is directly (independently) supplied to the main bag 63 and the sub-bag 64, respectively. Due thereto, at the airbag device 60 for a passenger's seat, the sub-bag 64 that has a relatively small volume is inflated and expanded in a short time from the operation of the inflator 22.

In particular, in the airbag device 60 for a passenger's seat, due to the inner tube 70 passing through the tethers 66, 68, gas of the inflator 22 is supplied to the chamber 64L at the most distal end. Accordingly, in the airbag device 60 for a passenger's seat, the sub-bag 64 is inflated and expanded in order from the distal end while the distal end side is moved downward (toward the vehicle front side of the knees K). Further, in particular, in the airbag device 60 for a passenger's seat, the outer bag expansion delaying structures 72 (the tear seams 74) are provided at the gas exit 70B sides at the inner tube 70. Therefore, gas of the inflator 22 is supplied to the sub-bag 64 selectively (preferentially) until the tear seams 74 are ruptured.

As described above, in the airbag device 60 for a passenger's seat, the sub-bag 64 can be inflated and expanded in a short time from the sensing of a front collision, at the vehicle front side of the knees K of the seated passenger P at which the space (stroke) in the vehicle longitudinal direction is small. Due to the sub-bag 64, the knees K are restrained, and the load applied to the knees K from the instrument panel 16 side is lessened. Namely, the knees K of the seated passenger P are protected. In particular, in the airbag device 60 for a passenger's seat, because the one-way valve 32 is provided at the gas exit 70C side at the inner tube 70, when the internal pressure of the sub-bag 64 rises accompanying the restraining of the knees K, the one-way valve 32 closes the gas exit 70C. Therefore, a drop in internal pressure of the sub-bag 64 (discharging of gas) that accompanies the restraining of the knees K is suppressed, and the knees K of the seated passenger P are protected better.

On the other hand, in the same way as the case of the airbag device 10 for a passenger's seat, the upper body U of the passenger P is restrained by the main bag 63 that is inflated and expanded, and impact absorption is achieved. In this way, at the present airbag device 60 for a passenger's seat, the upper body and the knees of the passenger can be effectively protected by a simple airbag structure.

Further, here, at the airbag device 60 for a passenger's seat, the sub-bag 64 is pushed-against (interferes with) the instrument panel 16 accompanying the restraining of the knees K, while the expanded state is maintained as is by the one-way valve 32. Therefore, at the sub-bag 64, in the same way as the reaction force supporting bag 54 at the airbag device 50 for a passenger's seat, a portion of the reaction force that accompanies the restraining of the upper body U is supported by the interference between the sub-bag 64 and the instrument panel 16, as well. Accordingly, the reaction force, that is supported by the frictional force F of the main bag 63 with the windshield glass 14 and the instrument panel 16, can be further reduced.

Due thereto, the airbag device 60 for a passenger's seat contributes to reducing the volume of the airbag 52 even more.

Note that, although an example is shown in the fourth embodiment in which gas from the inflator 22 is supplied to the sub-bag 64 and the respective reaction force supporting tubes 28 before the tear seams 74 rupture, the present invention is not limited to this, and, for example, may be a structure provided with an outer bag expansion delaying structure in which gas is supplied to the respective reaction force supporting tubes 28 and the main bag 63 after the inflation and expansion of the sub-bag 64. In this case, for example, the outer bag expansion delaying structures 72 or the like may be provided at the gas exit 70B, 70D sides with respect to the forked-off portion between the gas exit 70C side and the gas exit 70B, 70D sides at the 70.

Further, although an example in which the airbag 62 has the pair of reaction force supporting tubes 28 is shown in the fourth embodiment, the present invention is not limited to this, and, for example, the airbag 62 may be structured to have the single reaction force supporting tube 44 instead of the pair of reaction force supporting tubes 28.

Fifth Embodiment

Figure 11:
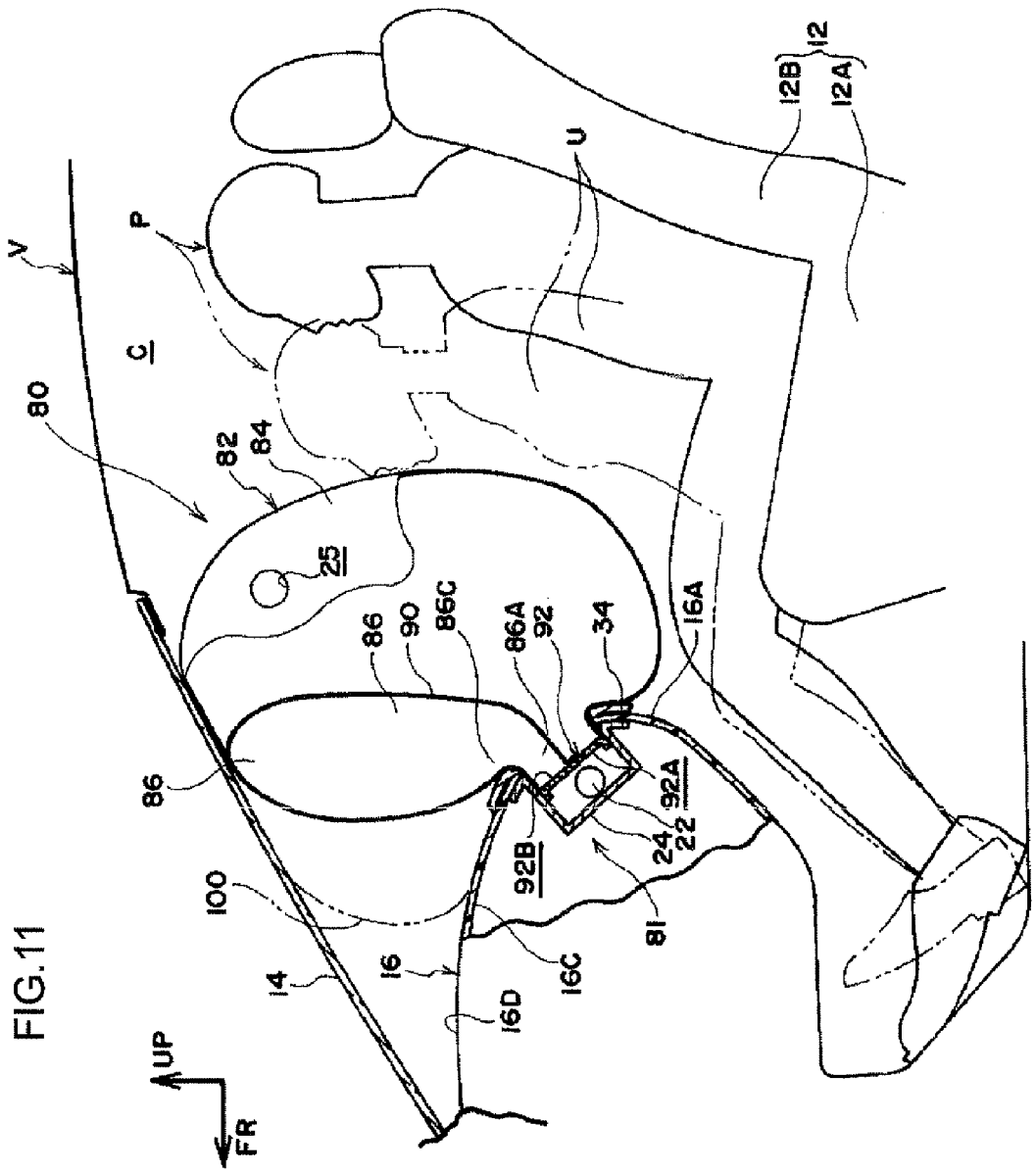
FIG. 11 is a side sectional view schematically showing an airbag expanded state at an airbag device for a passenger's seat relating to a fifth embodiment of the present invention.

An operated state of an airbag device 80 for a passenger's seat relating to a fifth embodiment of the present invention is shown in a schematic side sectional view in FIG. 11. Further, the front portion in the vehicle longitudinal direction at an airbag 82 that structures the airbag device 80 for a passenger's seat is shown in a plan sectional view in FIG. 12. As shown in these drawings, the airbag device 80 for a passenger's seat differs from the airbag device 10 for a passenger's seat relating to the first embodiment with regard to the point that the airbag 82 of the airbag device 80 for a passenger's seat has reaction force supporting bag portions 86 instead of the reaction force supporting tubes 28 that are inflated and expanded within the outer bag 26.

Figure 12:
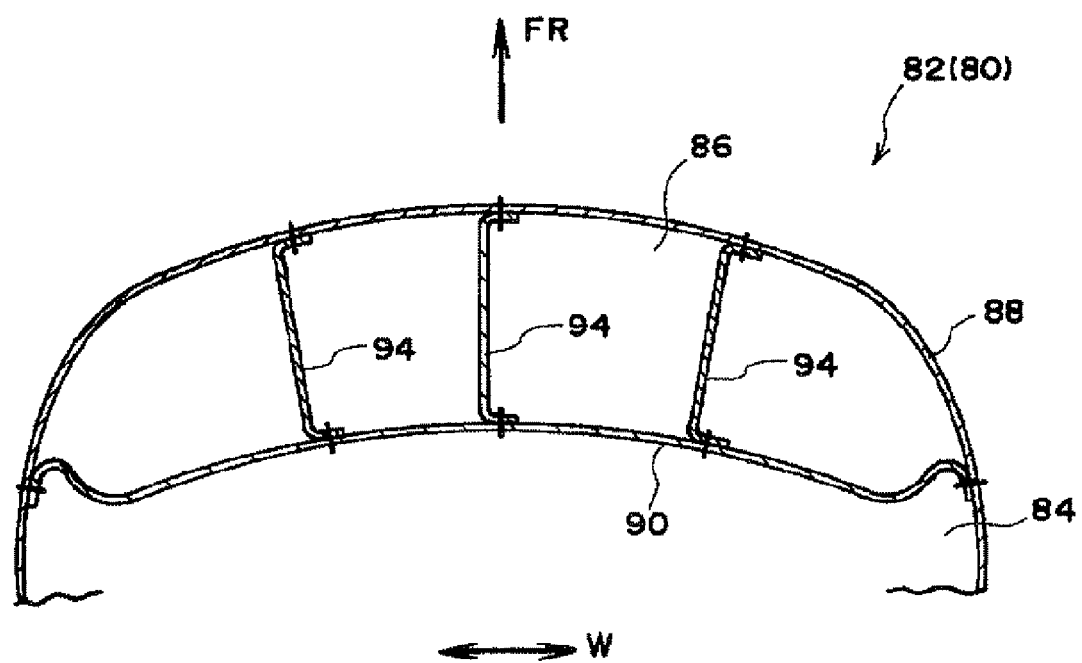
FIG. 12 is a plan sectional view showing, in an enlarged manner, a front portion of an airbag that structures the airbag device for a passenger's seat relating to the fifth embodiment of the present invention.

Concretely, at the airbag 82, as shown in FIG. 12, due to the interior of a bag body 88 that is formed from a common base cloth being demarcated in the vehicle longitudinal direction by a partitioning cloth 90 that is joined to that base cloth by sewing or the like, an outer bag 84 and the reaction force supporting bag portions 86 are adjacent in the vehicle longitudinal direction. Due thereto, at the airbag device 80 for a passenger's seat, the reaction force supporting bag portions 86 that serve as a second bag are structured so as to be inflated and expanded at the front side, in the vehicle longitudinal direction, with respect to the outer bag 84 for restraining the upper body U of the passenger P. The airbag 82 can also be interpreted as a structure in which a portion in the vehicle longitudinal direction at the outer bag 84 is made to be the reaction force supporting bag portions 86.

Further, at an airbag module 81 that structures the airbag device 80 for a passenger's seat, a diffuser (distributer) 92 serving as a gas distributing structure is fixedly provided by welding or the like at the airbag case 24 interior. One or plural main side openings 92A, that supply gas from the inflator 22 to the outer bag 84, and one or plural high-pressure side openings 92B, that supply gas from the inflator 22 to the reaction force supporting bag portions 86, are formed at the diffuser 92. The diffuser 92 is structured to distribute the gas of the inflator 22 such that the internal pressure of the reaction force supporting bag portions 86 becomes higher than the internal pressure of the outer bag 84. In this embodiment, at the diffuser 92, the opening surface areas of the main side opening 92A, the high-pressure side opening 92B are determined such that the supplied gas amount per volume is greater at the reaction force supporting bag portions 86 than at the outer bag 84. Note that, in the example shown in FIG. 11, the inflator 22 of a type that is long in the vehicle transverse direction is used but, in the same way as the airbag device 10 for a passenger's seat, the disc-type inflator 22 may be used.

Moreover, in this embodiment, the gas supply side from the diffuser 92 at the reaction force supporting bag portions 86 is made to be a narrowed portion 86A whose sectional surface area (the sectional surface area of the flow path of the gas that attempts to slip out from the reaction force supporting bag portions 86) is smaller than other portions. Due to this narrowed portion 86A and the high-pressure side opening 92B, the airbag device 80 for a passenger's seat is structured such that discharging of gas from the reaction force supporting bag portions 86 is suppressed. Accordingly, at the airbag device 80 for a passenger's seat, a state in which the internal pressure of the reaction force supporting bag portions 86 is higher than the internal pressure of the outer bag 84 is maintained, also in the state of restraining of the upper body U by the outer bag 84.

Still further, as shown in FIG. 12, the airbag 82 has straps 94 for suppressing swelling of the reaction force supporting bag portions 86 in the vehicle longitudinal direction. In this embodiment, the plural straps 94 are provided so as to be lined-up in the vehicle transverse direction. The other structures at the airbag device 40 for a passenger's seat, including portions that are not illustrated, are basically the same as the corresponding structures of the airbag device 10 for a passenger's seat.

Accordingly, by the airbag device 80 for a passenger's seat relating to the fifth embodiment as well, similar effects can be obtained by operation that is basically similar to the airbag device 10 for a passenger's seat relating to the first embodiment.

Concretely, in the airbag device 80 for a passenger's seat, when a front collision of the automobile V is detected or predicted on the basis of a signal from the collision sensor, the airbag ECU causes the inflator 22 to operate (ignite). Thus, the airbag 82 that receives the gas supply from the inflator 22 is inflated within the instrument panel 16, and due to the expansion pressure thereof, expands the airbag doors 34 and passes through the formed opening and is inflated and expanded at the vehicle cabin C. At this time, the gas that has passed-through the main side opening 92A of the diffuser 92 is supplied to the outer bag 84, and the gas that has passed-through the high-pressure side opening 92A is supplied to the reaction force supporting bag portions 86. Thus, the outer bag 84 and the reaction force supporting bag portions 86 are respectively inflated and expanded by gas pressure.

When the upper body U of the passenger P is moved relatively toward the front of the vehicle due to inertia caused by the front collision, the upper body U contacts the outer bag 84, and the movement toward the front of the vehicle is restrained at the outer bag 84. At this time, the reaction force supporting bag portions 86 receive pushing force toward the front of the vehicle via the outer bag 84, and upper end portions 86B are pushed against the windshield glass 14, and lower end portions 86C are pushed against the instrument panel 16. Accompanying the restraining of the upper body U, the internal pressure of the reaction force supporting bag portions 86 becomes high as compared with the outer bag 84 at which gas slips out from the vent hole 25, and a high internal pressure is maintained. Namely, at the reaction force supporting bag portions 86, that are communicated with the outer bag 84 (the vent hole 25) only through the narrowed portion 86A, the high-pressure side opening 9213 of the diffuser 92, the airbag case 24 and the high-pressure side opening 92A, discharging of gas from the interior thereof is suppressed, and the reaction force supporting bag portions 86 are maintained at high pressure as compared with the outer bag 84 that restrains the upper body U. In particular, before restraining of the upper body U, the internal pressure of the reaction force supporting bag portions 86 is higher than the internal pressure of the outer bag 84 due to the diffuser 92, and therefore, the internal pressure difference between the reaction force supporting bag portions 86 and the outer bag 84 at the time of restraining the upper body U becomes large.

Due thereto, the reaction force of the upper body U restraining by the outer bag 84 of the airbag 82 is supported by the frictional force F between the outer bag 84, and the windshield glass 14 and the instrument panel 16, and by the interference between the respective reaction force supporting bag portions 86, and the windshield glass 14 and the instrument panel 16. The reaction force supporting due to the interference between the respective reaction force supporting bag portions 86, and the windshield glass 14 and the instrument panel 16, can also be interpreted as support due to an engaging (stopper) function that is due to the portion, where rigidity is high due to high internal pressure, interfering with the vehicle body, and further can also be interpreted as support due to large frictional force that is due to large frictional resistance that is based on high internal pressure.

Further, as described above, at the airbag device 80 for a passenger's seat, a portion of the supported reaction force of the upper body U is supported by the interference between the reaction force supporting bag portions 86, and the windshield glass 14 and the instrument panel 16. Therefore, at the airbag device 80 for a passenger's seat, the portion of the reaction force supporting that is borne by the above-described frictional force F is reduced, and, as compared with an airbag that does not have the reaction force supporting bag portions 86, the volume of the outer bag 84 can be reduced.

This point is supplementarily described hereinafter. As described above, at the outer bag 84, the reaction force at the time of restraining the upper body U is supported (displacement toward the front of the vehicle is restricted) by the frictional force F with the windshield glass 14 and the instrument panel 16. On the other hand, in order to suppress the load at the time of restraining the upper body U, the frictional force cannot be ensured by the internal pressure (frictional resistance) of the outer bag 84 being made to be high. Therefore, in a structure that does not have the reaction force supporting bag portions 86, the frictional force must be ensured by making the contact surface area between the airbag 100, that is shown by the two-dot difference line in FIG. 1, and the windshield glass 14, the instrument panel 16 be relatively wide, and it is difficult to greatly reduce the volume of the airbag (the inflator 22).

In contrast, at the airbag 82, because a portion of the reaction force at the time of restraining the upper body U of the passenger P is supported by the reaction force supporting bag portions 86, the amount of contribution of the reaction force that is to be supported by the frictional force F is reduced as described above. In particular, at the airbag device 80 for a passenger's seat, because the reaction force supporting bag portions 86 are formed over substantially the entire width of (the vehicle front end of) the outer bag 84, the amount of contribution of the reaction force that is to be supported by the frictional force F at the outer bag 84 is reduced.

For these reasons, the contact surface area of the outer bag 84 with the windshield glass 14, the instrument panel 16 can be reduced, and the volume thereof can be greatly reduced as compared with the volume of the airbag 100. Further, as described above, the reaction force supporting bag portions 86 can be interpreted as structures that are expanded within the outer bag 84, and the volume of the airbag 82 as a whole is reduced as compared with the airbag 100. Further, the reduction in the volume of the airbag 82 also contributes to a reduction in the volume of the inflator 22.

In this way, the present airbag device 80 for a passenger's seat contributes to reducing the volume of the airbag 82.

Note that the above-described first through third embodiments illustrate examples in which the one-way valves 32, the diffuser 92 are provided as internal pressure difference imparting structures, gas discharge suppressing structures, but the present invention is not limited to this, and other structures can be employed as the internal pressure difference imparting structures, gas discharge suppressing structures. Accordingly, for example, draw strings that close the gas discharge (supplying) openings of the reaction force supporting tubes 28 or the like accompanying the inflation and expansion of the reaction force supporting tubes 28 (the reaction force supporting bag 54, the reaction force supporting bag portions 86) or the outer bag 26 (the outer bag 84), a hinge-type one-way valve (check valve) that is provided at the reaction force supporting bag portions 86 side of the diffuser 92 and opens and closes the high-pressure side opening 92B, an individual inflator of a volume corresponding to the reaction force supporting tubes 28 and the outer bag 26, or the like, can also be employed.

Moreover, the above-described respective embodiments illustrate examples in which the outer bag 26, 84 is an airbag of a so-called twin-chamber structure as if connecting left and right bags, but the present invention is not limited to this. Accordingly, for example, there may be a structure in which the outer bag 26, 96 is an airbag of a so-called single-chamber structure having a single chamber.

Still further, the above-described respective embodiments illustrate examples in which the airbag device relating to the present invention is applied to the airbag device 10 for a passenger's seat, but the present invention is not limited to this. Accordingly, for example, the airbag device relating to the present invention can be applied to a seat in the vehicle transverse direction center among seats in which three passengers can sit in the vehicle transverse direction, or the like. Further, such a central seat can also be interpreted as being included as a passenger's seat in the present invention.

The invention claimed is:

1. An airbag device comprising:
    a first bag that receives a gas supply and is inflated and expanded from a folded-up state within a rear portion of an instrument panel in a vehicle longitudinal direction to thereby restrain a vehicle passenger from a front side in the vehicle longitudinal direction;
    a second bag that: i) has a smaller volume than the first bag, ii) has a bag-body that is independent from the first bag, iii) receives the gas supply, and iv) is inflated and expanded from a folded-up state together with the first bag, in an interior of the first bag such that,
        when the first bag restrains the vehicle passenger, an upper end side portion of the second bag extending in a vehicle vertical direction contacts a windshield glass and a lower end side portion of the second bag contacts a surface of the instrument panel;
    an inflator that is configured to generate the gas supply to the first bag and the second bag;
    an internal pressure difference imparting structure that includes a gas discharge suppressing structure that is configured to: i) suppress discharging of gas that has been supplied to the second bag, and ii) make an internal pressure of the second bag higher than an internal pressure of the first bag, at least when the first bag restrains the vehicle passenger; and
    a gas flow path member that: i) is flexible, ii) is folded-up together with the first bag and the second bag, iii) is inflated and expanded by the gas supply from the inflator, and iv) directly supplies gas from the inflator to the first bag and the second bag respectively.

2. The airbag device of claim 1, wherein the gas discharge suppressing structure includes a one-way valve that is disposed along the gas flow path member or along a communicating portion of the gas flow path member and the second bag, and that permits gas flow from the gas flow path member to the second bag and prevents or suppresses gas flow from the second bag to the gas flow path member.

3. The airbag device of claim 1, wherein the second bag is configured to expand, within the first bag, into a shape which causes an interval between two edges of the second bag to gradually widen in a vehicle transverse direction, from a lower end toward an upper end in the vehicle vertical direction.

4. The airbag device of claim 1, further comprising:
    a third bag that: i) has a smaller volume than the first bag, ii) receives a gas supply through the gas flow path member, and iii) is inflated and expanded from a folded-up state, so as to contact the instrument panel at a lower side in the vehicle vertical direction with respect to the first bag at least when the first bag restrains the vehicle passenger; and
    a gas discharge suppressing structure that is configured to suppress discharging of gas that has been supplied to the third bag.

5. The airbag device of claim 4, wherein the third bag is inflated and expanded, to thereby restrain knees of the vehicle passenger from a rear side in the vehicle longitudinal direction.

6. An airbag device comprising:
    a first bag that receives a gas supply and is inflated and expanded from a folded-up state within a rear portion of an instrument panel in a vehicle longitudinal direction, to thereby restrain a vehicle passenger from a front side in the vehicle longitudinal direction;
    a pair of second bags that: i) are provided within the first bag, ii) have a smaller volume than the first bag, and iii) are configured to expand to thereby cause an interval between the pair of second bags in a vehicle transverse direction to gradually widen from a lower end toward an upper end in a vehicle vertical direction, iv) receive a gas supply, and v) are inflated and expanded from a folded-up state together with the first bag, in an interior of the first bag or at a front side of the first bag in the vehicle longitudinal direction with respect to the first bag such that,
        when the first bag restrains the vehicle passenger, an upper end side portion of the pair of second bags extending in a vehicle vertical direction contacts a windshield glass and a lower end side portion of the pair of second bags contacts a surface of the instrument panel;
    an inflator that is configured to generate the gas supply to the first bag and the pair of second bags;
    an internal pressure difference imparting structure that includes a gas discharge suppressing structure that is configured to: i) suppress discharging of gas that has been supplied to the pair of second bags, and ii) make an internal pressure of the pair of second bags higher than an internal pressure of the first bag, at least when the first bag restrains the vehicle passenger; and
    a gas flow path member that: i) is flexible, ii) is folded-up together with the first bag and the pair of second bags, iii) is inflated and expanded by the gas supply from the inflator, and iv) directly supplies gas from the inflator to the first bag and the pair of second bags, respectively.

7. The airbag device of claim 6, wherein the gas discharge suppressing structure includes a one-way valve that is disposed along the gas flow path member or along a communicating portion of the gas flow path member and the pair of second bags, and that permits gas flow from the gas flow path member to the pair of second bags and prevents or suppresses gas flow from the pair of second bags to the gas flow path member.

8. The airbag device of claim 7, further comprising:
    a third bag that: i) has a smaller volume than the first bag, ii) receives a gas supply through the gas flow path member, and iii) is inflated and expanded from a folded-up state, so as to contact the instrument panel at a lower side in the vehicle vertical direction with respect to the first bag at least when the first bag restrains the vehicle passenger; and a gas discharge suppressing structure that is configured to suppress discharging of gas that has been supplied to the third bag.

9. The airbag device of claim 8, wherein the third bag is inflated and expanded, to thereby restrain knees of the vehicle passenger from a rear side in the vehicle longitudinal direction.

* * * * *